US012656638B2

(12) United States Patent
Lee et al.

(10) Patent No.: US 12,656,638 B2
(45) Date of Patent: Jun. 16, 2026

(54) OPTICAL PATH CONTROL MEMBER AND DISPLAY DEVICE COMPRISING SAME

(71) Applicant: LG INNOTEK CO., LTD., Seoul (KR)

(72) Inventors: In Hae Lee, Seoul (KR); Chan Mi Ju, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 847 days.

(21) Appl. No.: 17/995,256

(22) PCT Filed: Apr. 6, 2021

(86) PCT No.: PCT/KR2021/004249
§ 371 (c)(1),
(2) Date: Sep. 30, 2022

(87) PCT Pub. No.: WO2021/210834
PCT Pub. Date: Oct. 21, 2021

(65) Prior Publication Data
US 2023/0176406 A1 Jun. 8, 2023

(30) Foreign Application Priority Data

| | | |
|---|---|---|
| Apr. 14, 2020 | (KR) | 10-2020-0045338 |
| May 8, 2020 | (KR) | 10-2020-0055057 |
| Mar. 30, 2021 | (KR) | 10-2021-0041154 |

(51) Int. Cl.
*G02F 1/13* (2006.01)
*G02F 1/1339* (2006.01)
(Continued)

(52) U.S. Cl.
CPC ............ *G02F 1/13* (2013.01); *G02F 1/13394* (2013.01); *G02F 1/137* (2013.01); *G02F 1/167* (2013.01);
(Continued)

(58) Field of Classification Search
CPC ........ G02F 1/13; G02F 1/1323; G02F 1/1675; G02F 1/1685; G02F 1/1679; G02F 1/13394; G02F 1/137; G02F 1/167; G02F 2201/44
See application file for complete search history.

(56) References Cited

U.S. PATENT DOCUMENTS

| | | | |
|---|---|---|---|
| 8,094,364 B2 | 1/2012 | Park | |
| 9,810,963 B2 | 11/2017 | Gauthier et al. | |
| (Continued) | | | |

FOREIGN PATENT DOCUMENTS

| | | |
|---|---|---|
| CN | 101446828 A | 6/2009 |
| CN | 105074560 A | 11/2015 |
| (Continued) | | |

OTHER PUBLICATIONS

Office Action dated May 20, 2025 in Korean Application No. 10-2021-0041154.
(Continued)

*Primary Examiner* — Stephone B Allen
*Assistant Examiner* — Tamara Y. Washington
(74) *Attorney, Agent, or Firm* — SALIWANCHIK, LLOYD & EISENSCHENK

(57) ABSTRACT

An optical path control member according to an embodiment comprises: a first substrate; a first electrode arranged on the first substrate; a second substrate arranged on the first substrate; a second electrode arranged beneath the second substrate; and a light conversion unit arranged between the first electrode and the second electrode, wherein the light conversion unit comprises a partition part and an accommodation part alternately arranged, the accommodation part includes a dispersion liquid and light conversion particles dispersed in the dispersion liquid, the accommodation part operates in a public mode or a privacy mode according to
(Continued)

whether a voltage is applied, a first voltage is applied when changing from the privacy mode to the public mode, a second voltage and a third voltage are applied when changing from the public mode to the privacy mode, and the second voltage and/or the third voltage include a pulse voltage.

6 Claims, 30 Drawing Sheets

(51) Int. Cl.

| | |
|---|---|
| *G02F 1/137* | (2006.01) |
| *G02F 1/167* | (2019.01) |
| *G02F 1/1679* | (2019.01) |
| *G02F 1/1685* | (2019.01) |

(52) U.S. Cl.

CPC .......... *G02F 1/1679* (2019.01); *G02F 1/1685* (2019.01); *G02F 1/1323* (2013.01); *G02F 2201/44* (2013.01)

(56) References Cited

U.S. PATENT DOCUMENTS

| | | | |
|---|---|---|---|
| 10,109,226 | B2 | 10/2018 | Joo et al. |
| 10,684,525 | B2 | 6/2020 | Gauthier et al. |
| 11,624,963 | B2 | 4/2023 | Gauthier et al. |
| 11,809,056 | B2 | 11/2023 | Yoon et al. |
| 2007/0057905 | A1 | 3/2007 | Johnson et al. |
| 2007/0126693 | A1 | 6/2007 | Johnson et al. |
| 2007/0139765 | A1 | 6/2007 | Daniel et al. |
| 2007/0269964 | A1 | 11/2007 | Sung |
| 2009/0135468 | A1 | 5/2009 | Park |
| 2009/0189184 | A1 | 7/2009 | Sung |
| 2011/0057871 | A1 | 3/2011 | Miyashita |
| 2014/0139501 | A1 | 5/2014 | Amundson |
| 2016/0012762 | A1 | 1/2016 | Joo et al. |
| 2016/0033841 | A1 | 2/2016 | Gauthier et al. |
| 2018/0101080 | A1 | 4/2018 | Gauthier et al. |
| 2019/0179208 | A1 | 6/2019 | Sato et al. |
| 2020/0050033 | A1* | 2/2020 | Galwaduge .......... G02F 1/1685 |
| 2020/0348575 | A1 | 11/2020 | Yoon et al. |
| 2021/0088868 | A1 | 3/2021 | Gauthier et al. |
| 2021/0116773 | A1 | 4/2021 | Yoon et al. |

FOREIGN PATENT DOCUMENTS

| | | | |
|---|---|---|---|
| JP | 2004-258615 | A | 9/2004 |
| JP | 2007-505340 | A | 3/2007 |
| JP | 2009-128915 | A | 6/2009 |
| JP | 2011-48001 | A | 3/2011 |
| JP | 2013-33074 | A | 2/2013 |
| JP | 2016-511447 | A | 4/2016 |
| JP | 2018-25682 | A | 2/2018 |
| KR | 10-2006-0105755 | A | 10/2006 |
| KR | 10-2009-0054278 | A | 5/2009 |
| KR | 10-2011-0027601 | A | 3/2011 |
| KR | 10-2011-0066794 | A | 6/2011 |
| KR | 10-2014-0112450 | A | 9/2014 |
| KR | 10-2015-0127658 | A | 11/2015 |
| KR | 10-2018-0004879 | A | 1/2018 |
| KR | 10-2019-0050369 | A | 5/2019 |
| KR | 10-2019-0050370 | A | 5/2019 |
| KR | 10-2019-0078831 | A | 7/2019 |
| WO | 2007/139765 | A2 | 12/2007 |
| WO | 2014/142589 | A1 | 9/2014 |

OTHER PUBLICATIONS

International Search Report dated Jul. 27, 2021 in International Application No. PCT/KR2021/004249.

Office Action dated Jul. 18, 2024 in Korean Application No. 10-2020-0045338.

Office Action dated Aug. 29, 2024 in Chinese Application No. 202180028755.0.

Supplementary European Search Report dated Apr. 17, 2024 in European Application No. 21788641.5.

Office Action dated Aug. 8, 2023 in Japanese Application No. 2022-562375.

* cited by examiner

PUBLIC MODE

PUBLICATION

LIGHT BLOCKING MODE

OPTICAL PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2021/004249, filed Apr. 6, 2021, which claims the benefit under 35 U.S.C. § 119 of Korean Application Nos. 10-2020-0045338, filed Apr. 14, 2020; 10-2020-0055057, filed May 8, 2020; and 10-2021-0041154, filed Mar. 30, 2021; the disclosures of each of which are incorporated herein by reference in their entirety.

TECHNICAL FIELD

An embodiment relates to an optical path control member, and to a display device including the same.

BACKGROUND ART

A light-shielding film blocks transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be an optical path control member that controls the movement path of light to block light in a specific direction and transmit light in a specific direction. Accordingly, it is possible to control the viewing angle of the user by controlling a transmission angle of the light by the light-shielding film.

Meanwhile, such a light-shielding film may be divided into a light-shielding film that can always control the viewing angle regardless of the surrounding environment or the user's environment and a switchable light-shielding film that allow the user to turn on/off the viewing angle control according to the surrounding environment or the user's environment.

Such a switchable light-shielding film may be implemented by switching a pattern part to a light transmitting part and a light blocking part by filling the inside of the pattern part with particles that may move when a voltage is applied and a dispersion liquid for dispersing the particles and by dispersing and aggregating the particles.

For example, by applying a positive voltage to particles charged with a negative charge to move the particles toward the electrode, the pattern part may be driven as a light transmitting part, and when the pattern part is to be switched to a light blocking part, a negative voltage may be applied to disperse the particles inside the dispersion liquid.

In this case, when switching from the light blocking part to the light transmitting part, the particles may not be dispersed well, or a time for which the particles are dispersed may increase, and thus there is a problem that shielding characteristics or driving characteristics of the optical path control member are deteriorated.

Therefore, there is a need for an optical path control member having a new structure capable of solving the problem of dispersibility of the particles.

DISCLOSURE

Technical Problem

An embodiment relates to an optical path control member capable of improving driving characteristics of a pattern part that is switched to a light transmitting part and a light blocking part.

Technical Solution

An optical path control member according to an embodiment includes: a first substrate; a first electrode disposed on the first substrate; a second substrate disposed on the first substrate; a second electrode disposed under the second substrate; and a light conversion unit disposed between the first electrode and the second electrode, wherein the light conversion unit includes a partition part and an accommodation part alternately disposed, the accommodation part includes a dispersion liquid and light conversion particles dispersed in the dispersion liquid, the accommodation part is driven in a public mode and a privacy mode depending on whether a voltage is applied, when the accommodation part is converted from the privacy mode to the public mode, a first voltage is applied, when the accommodation part is converted from the public mode to the privacy mode, a second voltage and a third voltage are applied, and at least one of the second voltage and the third voltage includes a pulse voltage.

Advantageous Effects

An optical path control member according to an embodiment can improve a driving speed and driving characteristics when the optical path control member is converted from a public mode to the privacy mode.

In detail, when moving light conversion particles in order to convert from the public mode to the privacy mode, the light conversion particles can be uniformly dispersed in a dispersion liquid in the privacy mode by applying a pulse voltage capable of uniformly dispersing the light conversion particles with a constant magnitude, time, and period.

Accordingly, a driving speed and driving characteristics of the optical path control member can be improved by inhibiting the light conversion particles from being concentrated in a specific region.

MODES OF THE INVENTION

Figure 1:
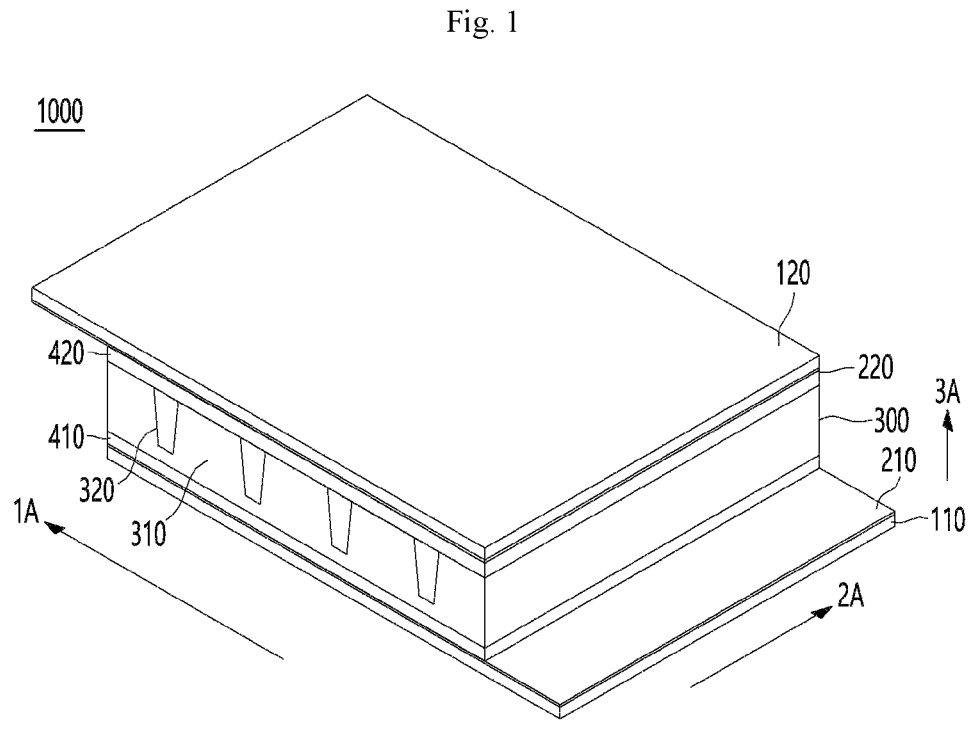
FIGS. 1 and 2 are perspective views of an optical path control member according to an embodiment.

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", or "coupled" to another element, it may include not only when the element is directly "connected" to, or "coupled" to other elements, but also when the element is "connected", or "coupled" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an optical path control member according to an embodiment will be described with reference to drawings. The optical path control member described below relates to a switchable optical path control member driven in various modes according to electrophoretic particles moving by application of a voltage.

Referring to FIGS. 1 to 4, an optical path control member 1000 according to an embodiment may include a first substrate 110, a second substrate 120, a first electrode 210, a second electrode 220, and a light conversion unit 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the optical path control member including the first substrate 110 may also be formed to have flexible, curved, or bent characteristics. Accordingly, the optical path control member according to the embodiment may be changed to various designs.

The first substrate 110 may extend in a first direction 1A, a second direction 2A, and a third direction 3A.

In detail, the first substrate 110 may include the first direction 1A corresponding to a length or width direction of the first substrate 110, a second direction 2A extending in a direction different from the first direction 1A and corresponding to the length or width direction of the first substrate 110, and a third direction 3A extending in a direction different from the first direction 1A and the second direction 2A and corresponding to a thickness direction of the first substrate 110.

For example, the first direction 1A may be defined as the length direction of the first substrate 110, the second direction 2A may be defined as the width direction of the first substrate 110 perpendicular to the first direction 1A, and the third direction 3A may be defined as the thickness direction of the first substrate 110. Alternatively, the first direction 1A may be defined as the width direction of the first substrate 110, the second direction 2A may be defined as the length direction of the first substrate 110 perpendicular to the first direction 1A, and the third direction 3A may be defined as the thickness direction of the first substrate 110.

Hereinafter, for convenience of description, the first direction 1A will be described as the length direction of the first substrate 110, the second direction 2A will be described as the width direction of the first substrate 110, and the third directions 3A will be described as the thickness direction of the first substrate 110.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may include a transparent conductive material. For example, the first electrode 210 may include a conductive material having a light transmittance of about 80% or more. For example, the first electrode 210 may include a metal oxide such as indium tin oxide, indium zinc oxide, copper oxide, tin oxide, zinc oxide, titanium oxide, etc.

The first electrode 210 may have a thickness of 0.05 µm to 2 µm.

Alternatively, the first electrode 210 may include various metals to realize low resistance. For example, the first electrode 210 may include at least one metal of chromium (Cr), nickel (Ni), copper (Cu), aluminum (Al), silver (Ag), molybdenum (Mo). Gold (Au), titanium (Ti), and alloys thereof.

Figure 3:
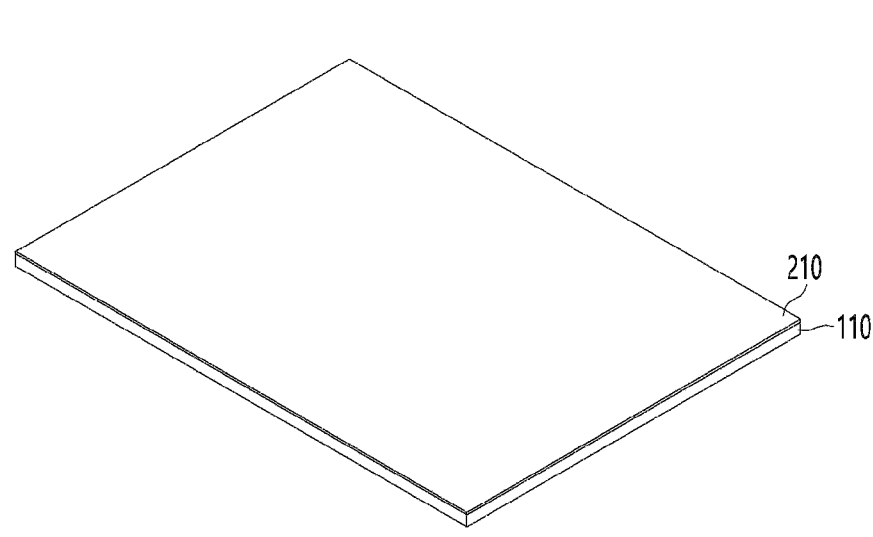
FIGS. 3 and 4 are perspective views of a first substrate and a first electrode and perspective views of a second substrate and a second electrode of the optical path control member according to the embodiment, respectively.

Referring to FIG. 3, the first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a uniform pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even though the first electrode 210 includes a metal, the first electrode 210 is not visually recognized from the outside, so that visibility may be improved. In addition, the light transmittance is increased by the openings, so that the brightness of the optical path control member according to the embodiment may be improved.

The second substrate 120 may be disposed on the first substrate 110. In detail, the second substrate 120 may be disposed on the first electrode 210 on the first substrate 110.

The second substrate 120 may include a material capable of transmitting light. The second substrate 120 may include a transparent material. The second substrate 120 may include a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS). This is only an example, but the embodiment is not limited thereto.

In addition, the second substrate 120 may be a flexible substrate having flexible characteristics.

Further, the second substrate 120 may be a curved or bended substrate. That is, the optical path control member including the second substrate 120 may also be formed to have flexible, curved, or bent characteristics. Accordingly, the optical path control member according to the embodiment may be changed to various designs.

The second substrate 120 may also extend in the first direction 1A, the second direction 2A, and the third direction 3A in the same manner as the first substrate 110 described above.

In detail, the second substrate 120 may include the first direction 1A corresponding to a length or width direction of the second substrate 120, the second direction 2A extending in a direction different from the first direction 1A and corresponding to the length or width direction of the second substrate 120, and the third direction 3A extending in the direction different from the first direction 1A and the second direction 2A and corresponding to the thickness direction of the second substrate 120.

For example, the first direction 1A may be defined as the length direction of the second substrate 120, the second direction 2A may be defined as the width direction of the second substrate 120 perpendicular to the first direction 1A, and the third direction 3A may be defined as the thickness direction of the second substrate 120.

Alternatively, the first direction 1A may be defined as the width direction of the second substrate 120, the second direction 2A may be defined as the length direction of the second substrate 120 perpendicular to the first direction 1A, and the third direction 3A may be defined as the thickness direction of the second substrate 120.

Hereinafter, for convenience of description, the first direction 1A will be described as the length direction of the second substrate 120, the second direction 2A the second direction 2A will be described as the width direction of the second substrate 120, and the third directions 3A will be described as the thickness direction of the second substrate 120.

The second electrode 220 may be disposed on one surface of the second substrate 120. In detail, the second electrode 220 may be disposed on a lower surface of the second substrate 120. That is, the second electrode 220 may be disposed on one surface of the second substrate 120 in which the second substrate 120 and the first substrate 110 face each other. That is, the second electrode 220 may be disposed to face the first electrode 210 on the first substrate 110. That is, the second electrode 220 may be disposed between the first electrode 210 and the second substrate 120.

The second electrode 220 may include a material the same as or similar to that of the first substrate 110 described above.

The second electrode 220 may include a transparent conductive material. For example, the second electrode 220 may include a conductive material having a light transmittance of about 80% or more. As an example, the second electrode 220 may include a metal oxide such as indium tin oxide, indium zinc oxide, copper oxide, tin oxide, zinc oxide, titanium oxide, etc.

The second electrode 220 may have a thickness of about 0.1 µm to about 0.5 µm.

Alternatively, the second electrode 220 may include various metals to realize low resistance. For example, the second electrode 220 may include at least one metal of chromium (Cr), nickel (Ni), copper (Cu), aluminum (Al), silver (Ag), molybdenum (Mo), gold (Au), titanium (Ti), and alloys thereof.

Figure 4:
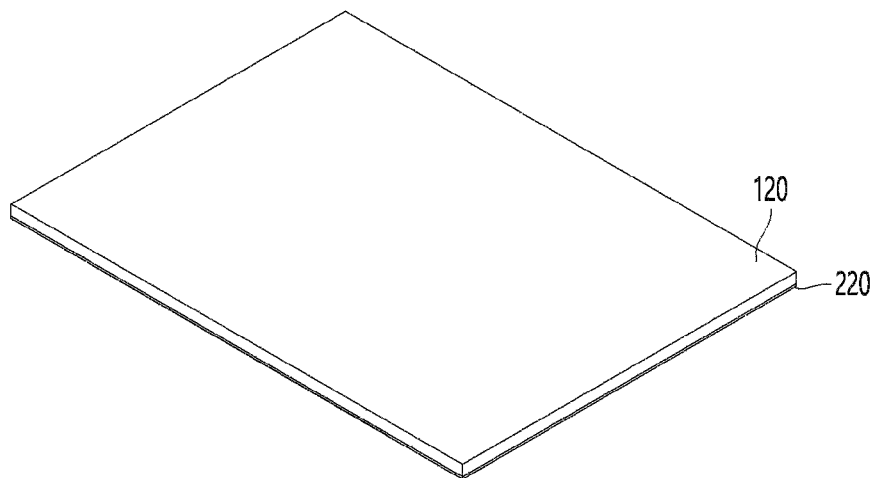

Referring to FIG. 4, the second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a uniform pattern such as a mesh or stripe shape.

For example, the second electrode 220 may include a plurality of conductive patterns. In detail, the second electrode 220 may include a plurality of mesh lines crossing each other and a plurality of mesh openings formed by the mesh lines.

Accordingly, even though the second electrode 220 includes a metal, the second electrode 220 is not visually recognized from the outside, so that visibility may be improved. In addition, the light transmittance is increased by the openings, so that the brightness of the optical path control member according to the embodiment may be improved.

The first substrate 110 and the second substrate 120 may have sizes corresponding to each other. The first substrate 110 and the second substrate 120 may have sizes the same as or similar to each other.

In detail, a first length extending in the first direction 1A of the first substrate 110 may have a size the same as or similar to a second length L2 extending in the first direction 1A of the second substrate 120.

For example, the first length and the second length may have a size of 300 mm to 400 mm.

In addition, a first width extending in the second direction 2A of the first substrate 110 may have a size the same as or similar to a second width extending in the second direction 2A of the second substrate 120.

For example, the first width and the second width may have a size of 150 mm to 200 mm.

In addition, a first thickness extending in the third direction 3A of the first substrate 110 may have a size the same as or similar to a second thickness extending in the third direction 3A of the second substrate 120.

For example, the first thickness and the second thickness may have a size of 30 μm to 200 μm.

Alternatively, the first substrate 110 and the second substrate 120 may have different sizes.

In detail, the first length extending in the first direction 1A of the first substrate 110 may have a length the same as or similar to the second length L2 extending in the first direction 1A of the second substrate 120 within a size range of 300 mm to 400 mm.

In addition, the first width extending in the second direction 2A of the first substrate 110 may have a size different from the second width extending in the second direction 2A of the second substrate 120 within a size range of 150 mm to 200 mm.

For example, the second width extending in the second direction of the second substrate 120 may be smaller than the size of the first width extending in the second direction 2A of the first substrate 110.

Referring to FIG. 1, the first substrate 110 and the second substrate 120 may be disposed to be misaligned from each other.

In detail, the first substrate 110 and the second substrate 120 may be disposed at positions crossing each other in the first direction 1A. In detail, the first substrate 110 and the second substrate 120 may be disposed so that side surfaces of the substrates be misaligned from each other.

Accordingly, the first substrate 110 may be disposed to protrude in one direction of the first direction 1A, and the second substrate 120 may be disposed to protrude in the other direction of the first direction 1A.

That is, the first substrate 110 may include a first protrusion protruding in one direction in the first direction 1A, and the second substrate 110 may include a second protrusion protruding in the other direction in the first direction 1A.

Accordingly, the optical path control member 1000, may include a region where the first electrode 210 is exposed on the first substrate 110 and a region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to an external printed circuit board through a pad part that will be described below.

Figure 2:
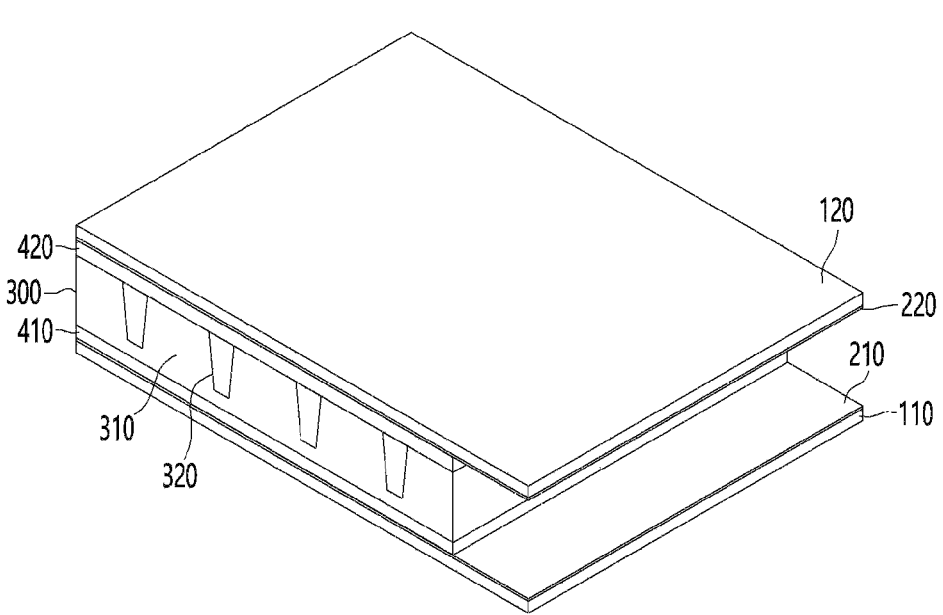

Alternatively, referring to FIG. 2, the first substrate 110 and the second substrate 120 may be disposed at positions corresponding to each other. In detail, the first substrate 110 and the second substrate 120 may be disposed so that each side surface corresponds to each other.

Accordingly, the first substrate 110 may be disposed to protrude in one direction of the first direction 1A, and the second substrate 120 may also be disposed in one direction of the first direction 1A, that is, may be disposed to protrude in the same direction as the first substrate 110.

That is, the first substrate 110 may include the first protrusion that protrudes in one direction in the first direction 1A, and the second substrate may also include the second protrusion that protrudes in one direction in the first direction 1A.

That is, the first protrusion and the second protrusion may protrude in the same direction.

Accordingly, the optical path control member 1000 may include the region where the first electrode 210 is exposed on the first substrate 110 and the second electrode 220 the region where the second electrode 220 is exposed under the second substrate 120.

That is, the first electrode 210 disposed on the first substrate 110 may be exposed at the first protrusion, and the second electrode 220 disposed under the second substrate 120 may be exposed at the second protrusion.

The first electrode 210 and the second electrode 220 exposed at the protrusions may be connected to the external printed circuit board through a connection part to be described below.

The light conversion unit 300 may be disposed between the first substrate 110 and the second substrate 120. In detail, the light conversion unit 300 may be disposed between the first electrode 210 and the second electrode 220.

An adhesive layer or a buffer layer may be disposed between at least one of between the light conversion unit 300 and the first substrate 110 or between the light conversion unit 300 and the second substrate 120, and the first substrate 110, the second substrate 120, and the light conversion unit 300 may be adhered to each other by the adhesive layer and/or the first substrate 110.

The light conversion unit 300 may include a plurality of partition parts and accommodation parts. Light conversion particles that move according to the application of voltage may be disposed in the accommodation part, and light transmission characteristics of the optical path control member may be changed by the light conversion particles.

The optical path control member may include a sealing part.

Referring to FIGS. 5 to 10, a sealing part 500 may be disposed on an outer surface of the optical path control member.

Figures 5, 6:
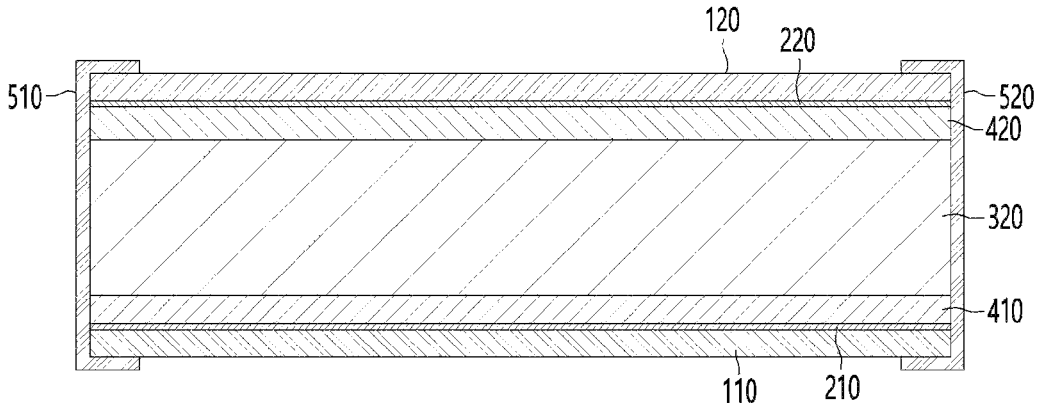
FIG. 5 is a perspective view for describing that a sealing part is disposed on the optical path control member according to the embodiment
FIG. 6 is view showing a cross-sectional view taken along line A-A' of FIG. 5.
Figures 7, 8:
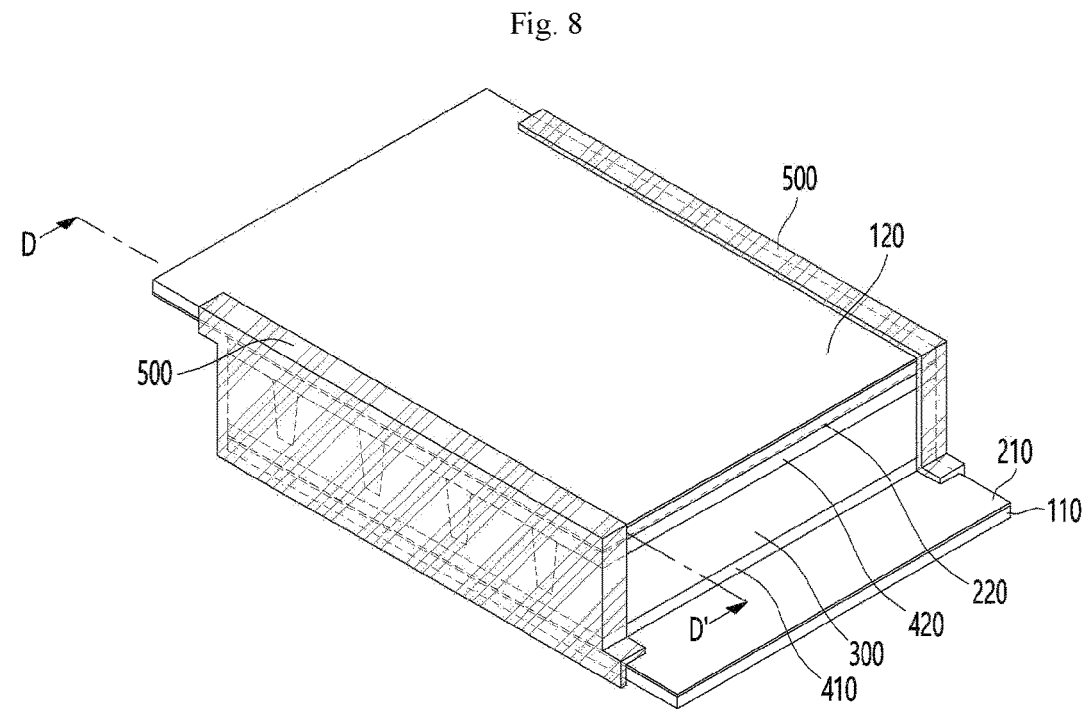
FIG. 7 is view showing a cross-sectional view taken along line B-B' of FIG. 5.
FIG. 8 is a perspective view for describing that a sealing part is disposed on an optical path control member according to another embodiment.

Referring to FIGS. 5 to 7, the sealing part 500 may be disposed to cover the outer surface of the optical path control member. In detail, the sealing part 500 may be disposed to partially cover the outer surface of the optical path control member. That is, the sealing part 500 may be disposed to partially cover the outer surface of the optical path control member while extending from the first substrate 110 toward the second substrate 120.

The optical path control member 1000 may include a plurality of side surfaces. In detail, the optical path control member 1000 may include side surfaces extending in the first direction 1A and facing each other and side surfaces extending in the second direction 2A and facing each other.

The sealing part 500 may be disposed to surround the side surfaces of the optical path control member extending in the first direction 1A. For example, the sealing part 500 may be disposed to surround the side surfaces of the optical path control member in which the accommodation part 320 in which the light conversion particles are disposed is exposed at the light conversion unit 300.

In detail, the accommodation part 320 may be disposed to extend from the light conversion unit 300 in the second direction 2A based on the first substrate 110 and the second substrate 120. That is, the plurality of accommodation parts 320 may be disposed to extend in the second direction 2A while being spaced apart from each other.

Accordingly, an accommodation part 320 may be exposed in both surface directions of the first direction 1A of the light conversion unit 300. The sealing part 500 may be disposed to cover the accommodation part 320 exposed at the light conversion unit 300 to protect the light conversion particles inside the exposed accommodation part.

That is, the sealing part 500 may be disposed on a part of a side surface of the light conversion unit 300, a part of a lower surface of the first substrate 110, and a part of an upper surface of the second substrate 120. In other words, the sealing part 500 may be disposed on a part of the side surface of the light conversion unit 300, a part of the lower surface of the first substrate 110, and a part of the upper surface of the second substrate 120 while surrounding the exposed accommodation part of the light conversion unit.

The sealing part 500 may include a resin material having a viscosity of 300 cP or more.

The sealing part 500 may include a first sealing part 510 and a second sealing part 520.

In detail, the first sealing part 510 may be disposed on one side surface of the light conversion unit 300 in the first direction, and the second sealing part 520 may be disposed on the other side surface of the light conversion unit in the first direction.

The first sealing part 510 and the second sealing part 520 may be disposed to be spaced apart from each other.

Alternatively, the first sealing part 510 and the second sealing part 520 may be integrally formed with each other. For example, the first sealing part 510 and the second sealing part 520 may be in contact with each other while extending in the second direction from both ends in the first direction of the first substrate 110 or the second substrate 120.

The first sealing part 510 and the second sealing part 520 may be disposed to face each other. The first sealing part 510 and the second sealing part 520 may be respectively disposed on both side surfaces of the light conversion unit 300 in the first direction 1A.

In detail, referring to FIG. 6, the first sealing part 510 and the second sealing part 520 may be disposed to partially surround an outer circumferential surface of the optical path control member while extending along the lower surface of the first substrate 110 and the side surface in the first direction, a side surface of the first electrode 210 in the first direction, a side surface of a buffer layer 410 in the first direction, a side surface of the accommodation part 320 in the first direction, a side surface of an adhesive layer 420 in the first direction, a side surface of the second electrode 220 in the first direction, and the upper surface of the second substrate 120 and the side surface in the first direction.

In addition, referring to FIG. 7, the first sealing part 510 and the second sealing part 520 may be partially disposed on the both side surfaces of the light conversion unit 300 extending in the first direction. That is, the first sealing part 510 and the second sealing part 520 may be disposed to partially cover the partition parts 310 disposed at both ends of the both side surfaces of the light conversion unit 300 extending in the first direction. That is, lengths of the first sealing part 510 and the second sealing part 520 extending in the first direction may be smaller than lengths of the both side surfaces of the light conversion unit 300 extending in the first direction, respectively.

Accordingly, a region where the sealing part 500 is disposed and a region where the sealing part 500 is not disposed may be defined in the first substrate 110 and the second substrate 120.

In detail, a first region where the first sealing part 510 and the second sealing part 520 are disposed and a second region where the sealing part 510 and the second sealing part 520 are not disposed and the lower portion of the first substrate 110 or the upper portion of the second substrate 120 is exposed may be defined in the lower portion of the first substrate 110 and the upper portion of the second substrate 120, respectively.

In this case, a size of the first region may be greater than that of the second region. In detail, an area of the first region may be 10% or less of a total area of the first substrate 110 or the second substrate 120.

In detail, the area of the first region may be 1% to 10% of the total area of the first substrate 110 or the second substrate 120. In more detail, the area of the first region may be 3% to 7% of the total area of the first substrate 110 or the second substrate 120.

When the area of the first region exceeds 10% of the total area of the first substrate 110 or the second substrate 120, in the first substrate 110 or the second substrate 120, transmittance of light transmitted or incident to/on the first substrate 110 or the second substrate 120 may be reduced by the sealing part, thereby reducing overall brightness of the optical path control member.

In addition, when the area of the first region is less than 1% of the total area of the first substrate 110 or the second substrate 120, the area of the sealing part in contact with the first substrate 110 or the second substrate 120 is reduced, and thus adhesive characteristics of the sealing part may be deteriorated and the sealing part may be removed, thereby reducing the reliability of the optical path control member.

Figures 9, 10:
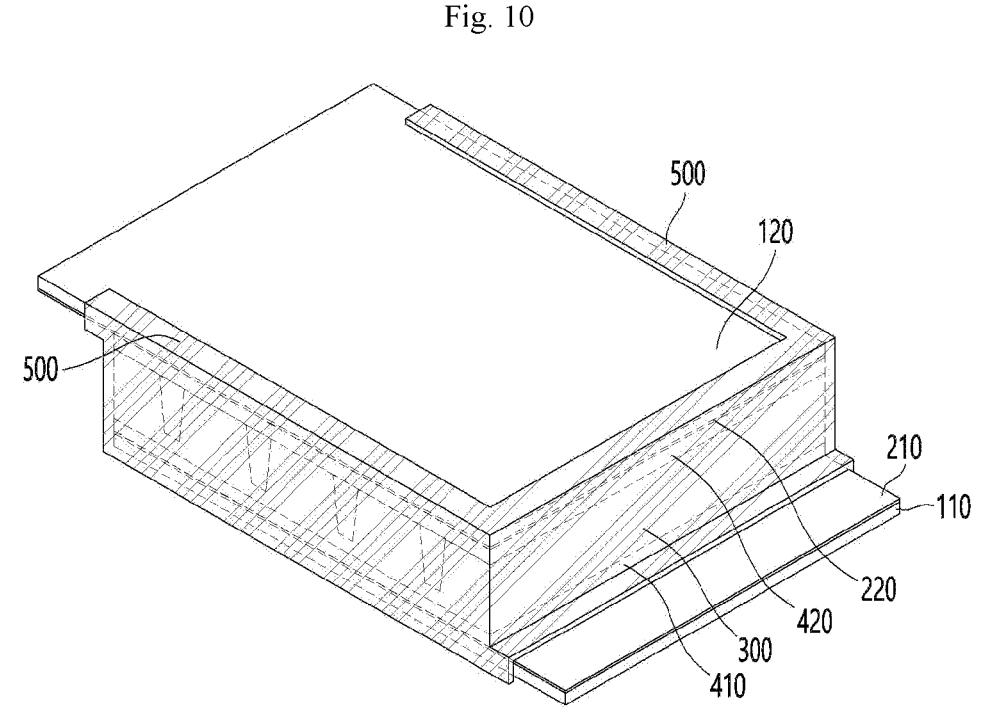
FIG. 9 is view showing a cross-sectional view taken along line D-D' of FIG. 8.
FIG. 10 is a perspective view for describing that a sealing part is disposed on an optical path control member according to still another embodiment.

Referring to FIGS. 8 and 9, the sealing part 500 may be disposed to have a length greater than the lengths of the both side surfaces of the light conversion unit 300 extending in the first direction. That is, the sealing part 500 may be disposed to entirely cover the both side surfaces of the light conversion unit 300 extending in the first direction.

In detail, referring to FIGS. 8 and 9, the first sealing part 510 and the second sealing part 520 may be disposed to partially surround the outer circumferential surface of the optical path control member while extending along the lower surface of the first substrate 110 and the side surface extending in the first direction, a side surface extending in the first direction of the first electrode 210, a side surface extending in the first direction of the buffer layer 410, a side surface extending in the first direction of the accommodation part 320, a side surface extending in the first direction of the adhesive layer 420, a side surface extending in the first direction of the second electrode 220, and the upper surface of the second substrate 120 and the side surface extending in the first direction.

In addition, referring to FIG. 10, the sealing part 500 may be disposed to surround the side surfaces of the optical path control member extending in the first direction 1A and the side surfaces of the optical path control member extending in the second direction 2A.

Accordingly, at least one of the side surfaces of the light conversion unit 300 in the second direction may also be entirely surrounded by the sealing part 500.

Accordingly, in the optical path control member according to the embodiment, an outer side surface of the light conversion unit 300 may be entirely sealed by the sealing part 500. That is, it is possible to inhibit penetration of impurities, such as moisture and air, that may penetrate into the accommodation part from the side surface of the light conversion unit 300 in the second direction.

That is, during a manufacturing process of the optical path control member, thicknesses of the side surfaces of the light conversion unit 300 in the second direction may be different from each other due to tolerance, and a width of any one of the side surfaces in the second direction is formed to be small, so that the impurities that may permeate into the accommodation part may permeate into the accommodation part through the partition part.

In the optical path control member according to the embodiment, by disposing the sealing part on the side surface of the light conversion unit in the second direction, it is possible to effectively inhibit impurity penetration according to a size of the partition part.

Meanwhile, it is illustrated that the sealing part is disposed on the outer surface of the optical path member in FIGS. 5 to 10, but the embodiment is not limited thereto, and the sealing part may be disposed on the upper surface of the light conversion unit 300.

For example, the light conversion unit 300 may include an accommodation part region that is not filled with the dispersion liquid, the sealing part may fill the accommodation part region that is not filled with the dispersion liquid on the light conversion unit 300, and the sealing part may be disposed to partially cover the adhesive layer 420, the second electrode 220, the side surface of the second substrate 120 in the first direction, and the upper surface of the second substrate 120.

That is, when a plurality of optical path control members are manufactured by cutting a large-area optical path control member, the sealing part may be formed as shown in FIGS. 5 to 7, and when a small-area optical path control member is manufactured, the sealing part may be disposed on the light conversion unit 300 while filling the accommodation part region where the dispersion liquid is not filled.

Figure 11:
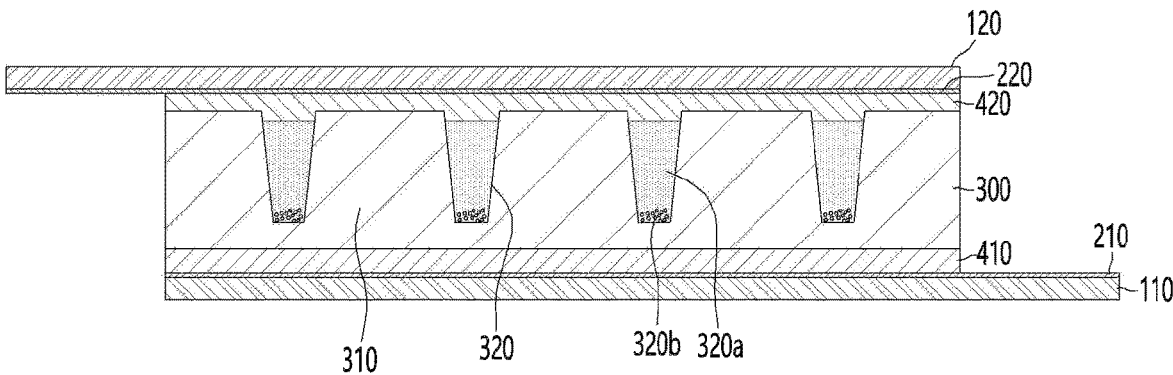
FIGS. 11 and 12 are views showing a cross-sectional view taken along line C-C' of FIG. 5.
Figure 12:
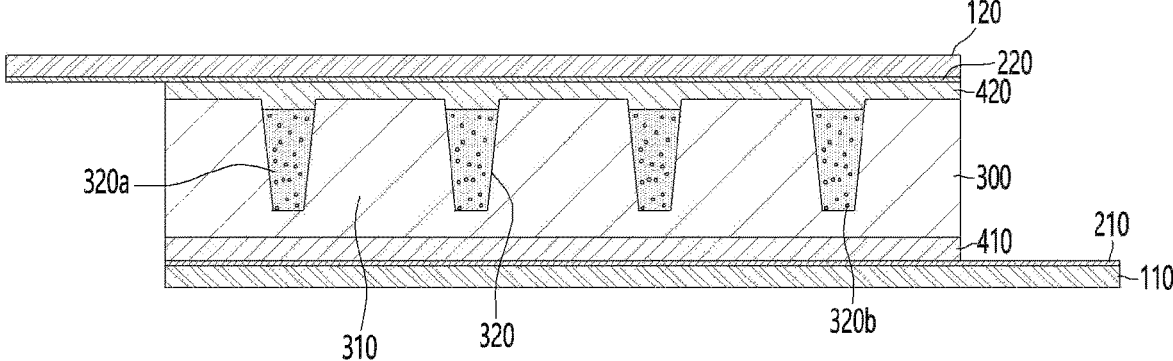

Referring to FIGS. 11 and 12, the light conversion unit 300 may include a partition part 310, and an accommodation part 320.

The partition part 310 may be defined as a partition wall unit dividing the accommodation part. That is, the partition part 310 may transmit light as a barrier region dividing a plurality of accommodation parts. In addition, the accommodation part 320 may be defined as a variable region where the accommodation part 320 is switched to a light blocking part and a light transmitting part according to application of a voltage.

The partition part 310 and the accommodation part 320 may be alternately disposed with each other. The partition part 310 and the accommodation part 320 may be disposed to have different widths. For example, a width of the partition part 310 may be greater than that of the accommodation part 320.

The partition part 310 and the accommodation part 320 may be alternately disposed with each other. In detail, the partition part 310 and the accommodation part 320 may be alternately disposed with each other. That is, each of the partition parts 310 may be disposed between the accommodation parts 320 adjacent to each other, and each of the accommodation parts 320 may be disposed between the adjacent partition parts 310.

The partition part 310 may include a transparent material. The partition part 310 may include a material that may transmit light.

The partition part 310 may include a resin material. For example, the partition part 310 may include a photo-curable resin material. As an example, the partition part 310 may include a UV resin or a transparent photoresist resin. Alternatively, the partition part 310 may include urethane resin or acrylic resin.

The partition part 310 may transmit light incident on any one of the first substrate 110 and the second substrate 120 toward another substrate.

For example, in FIGS. 11 and 12, light may be emitted from the first substrate 110 by a light source disposed under the first substrate 110, and the light may be incident toward the second substrate 120. In this case, the partition part 310 may transmit the light, and the transmitted light may move toward the second substrate 120.

The accommodation part 320 may include the dispersion liquid 320a and the light conversion particles 320b. In detail, the accommodation part 320 may be filled by injecting the dispersion liquid 320a. A plurality of light conversion particles 320b may be dispersed in the dispersion liquid 320a.

The dispersion liquid 320a may be a material for dispersing the light conversion particles 320b. The dispersion liquid 320a may include a transparent material. The dispersion liquid 320a may include a non-polar solvent. In addition, the dispersion liquid 320a may include a material capable of transmitting light. For example, the dispersion liquid 320a may include at least one of a halocarbon-based oil, a paraffin-based oil, and isopropyl alcohol.

The light conversion particles 320b may be disposed to be dispersed in the dispersion liquid 320a. In detail, the plurality of light conversion particles 320b may be disposed to be spaced apart from each other in the dispersion liquid 320a.

The light conversion particles 320b may include a material capable of absorbing light. That is, the light conversion particles 320b may be light absorbing particles. The light conversion particles 320b may have a color. For example, the light conversion particles 320b may have a black-based color. As an example, the light conversion particles 320b may include carbon black.

The light conversion particles 320b may have a polarity by charging a surface thereof. For example, the surface of the light conversion particles 320b may be charged with a negative (—) charge. Accordingly, according to the application of the voltage, the light conversion particles 320b may move toward the first electrode 210 or the second electrode 220.

The light transmittance of the accommodation part 320 may be changed by the light conversion particles 320*b*. In detail, the accommodation part 320 may be switched to the light blocking part and the light transmitting part by changing the light transmittance due to the movement of the light conversion particles 320*b*. That is, the accommodation part 320 may change the transmittance of light passing through the accommodation part 320 by dispersion and aggregation of the light conversion particles 320*b* disposed inside the dispersion liquid 320*a*.

For example, the optical path control member according to the embodiment may be converted from a first mode to a second mode or from the second mode to the first mode by a voltage applied to the first electrode 210 and the second electrode 220.

In detail, in the optical path control member according to the embodiment, the accommodation part 320 becomes the light blocking part in the first mode, and light of a specific angle may be blocked by the accommodation part 320. That is, a viewing angle of the user viewing from the outside is narrowed, so that the optical path control member may be driven in the privacy mode.

In addition, in the optical path control member according to the embodiment, the accommodation part 320 becomes the light transmitting part in the second mode, and in the optical path control member according to the embodiment, light may be transmitted through both the partition part 310 and the accommodation part 320. That is, the viewing angle of the user viewing from the outside may be widened, so that the optical path control member may be driven in the public mode.

Switching from the first mode to the second mode, that is, the conversion of the accommodation part 320 from the light blocking part to the light transmitting part may be realized by movement of the light conversion particles 320*b* of the accommodation part 320. That is, the light conversion particles 320*b* may have a charge on the surface thereof and may move toward the first electrode or the second electrode according to the application of a voltage according to characteristics of the charge. That is, the light conversion particles 320*b* may be electrophoretic particles In detail, the accommodation part 320 may be electrically connected to the first electrode 210 and the second electrode 220.

In this case, when a voltage is not applied to the optical path control member from the outside, the light conversion particles 320*b* of the accommodation part 320 are uniformly dispersed in the dispersion liquid 320*a*, and the accommodation part 320 may block light by the light conversion particles. Accordingly, in the first mode, the accommodation part 320 may be driven as the light blocking part.

Alternatively, when a voltage is applied to the optical path control member from the outside, the light conversion particles 320*b* may move. For example, the light conversion particles 320*b* may move toward one end or the other end of the accommodation part 320 by a voltage transmitted through the first electrode 210 and the second electrode 220. That is, the light conversion particles 320*b* may move from the accommodation part 320 toward the first electrode 210 or the second electrode 220.

In detail, when a voltage is applied to the first electrode 210 and/or the second electrode 220, an electric field is formed between the first electrode 210 and the second electrode 220, and the light conversion particles 320*b* charged with the negative charge may move toward a positive electrode of the first electrode 210 and the second electrode 220 using the dispersion liquid 320*a* as a medium.

That is, when the voltage is applied to the first electrode 210 and/or the second electrode 220, as shown in FIG. 11, the light conversion particles 320*b* may move toward the first electrode 210 in the dispersion liquid 320*a*. That is, the light conversion particles 320*b* may move in one direction, and the accommodation part 320 may be driven as the light transmitting part.

Alternatively, when the voltage is not applied to the first electrode 210 and/or the second electrode 220, as shown in FIG. 11, the light conversion particles 320*b* may be uniformly dispersed in the dispersion liquid 320*a* to drive the accommodation part 320 as the light blocking part.

Accordingly, the optical path control member according to the embodiment may be driven in two modes according to a user's surrounding environment. That is, when the user requires light transmission only at a specific viewing angle, the accommodation part is driven as the light blocking part, or in an environment in which the user requires high brightness, a voltage may be applied to drive the accommodation part as the light transmitting part.

Therefore, since the optical path control member according to the embodiment may be implemented in two modes according to the user's requirement, the optical path control member may be applied regardless of the user's environment.

Meanwhile, the accommodation part may be disposed in a different shape in consideration of driving characteristics and the like.

Figure 13:
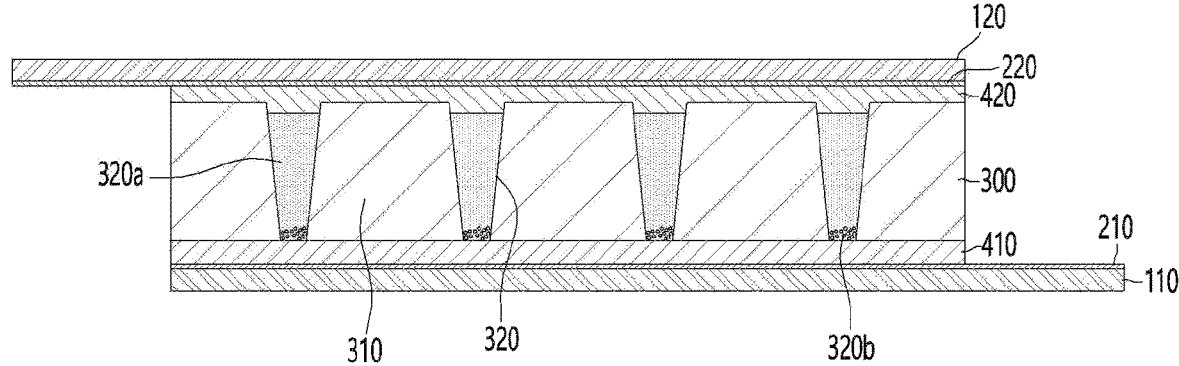
FIGS. 13 to 16 are views showing the cross-sectional view taken along line C-C' of FIG. 5 for describing shapes of various accommodation parts excluding the sealing part in the optical path control member according to the embodiment.
Figure 14:
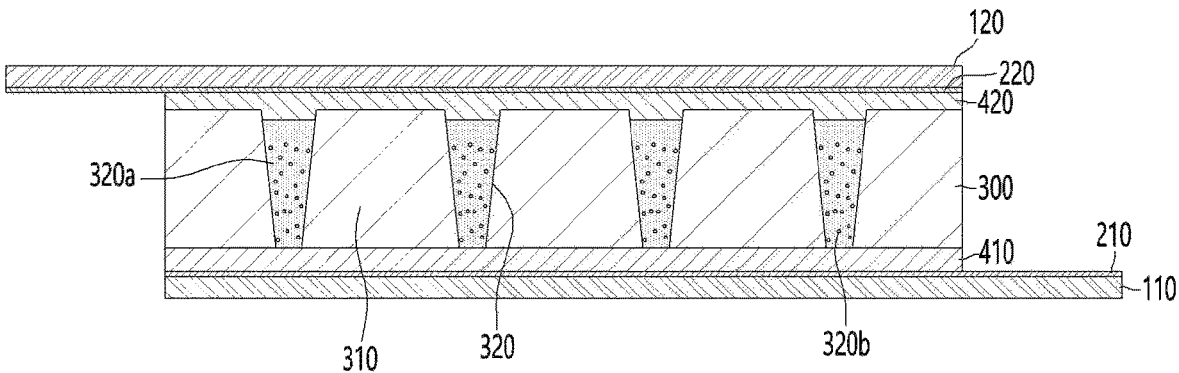

Referring to FIGS. 13 and 14, in an optical path control member according to another embodiment, both ends of the accommodation part 320 may be disposed in contact with the buffer layer 410 and the adhesive layer 420 unlike FIGS. 11 and 12.

For example, a lower portion of the accommodation part 320 may be disposed in contact with the buffer layer 410, and an upper portion of the accommodation part 320 may be disposed in contact with the adhesive layer 420.

Accordingly, a distance between the accommodation part 320 and the first electrode 210 may be reduced, so that the voltage applied from the first electrode 210 may be smoothly transmitted to the accommodation part 320.

Accordingly, a moving speed of the light conversion particles 320*b* inside the accommodation part 320 may be improved, and thus the driving characteristics of the optical path control member may be improved.

Figure 15:
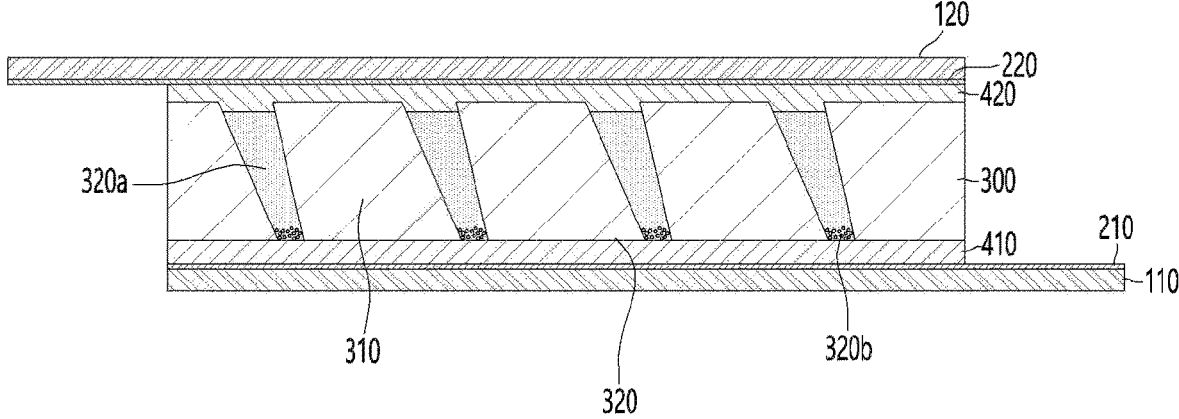
Figure 16:
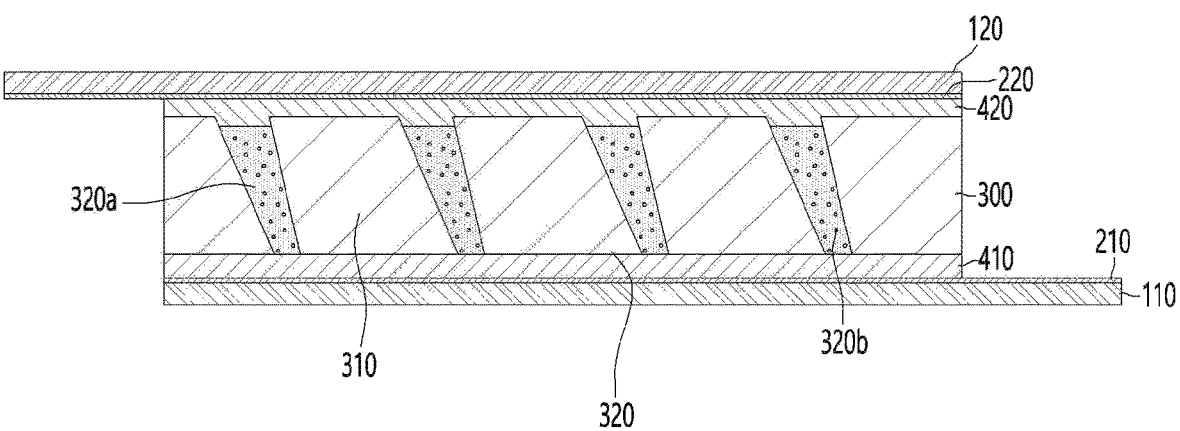

In addition, referring to FIGS. 15 and 16, in the optical path control member according to the embodiment, the accommodation part 320 may be disposed to have a constant inclination angle θ, unlike FIGS. 11 and 12.

In detail, referring to FIGS. 15 and 16, the accommodation part 320 may be disposed to have an inclination angle θ of greater than 0° to less than 90° with respect to the first substrate 110. In detail, the accommodation part 320 may extend upward while having the inclination angle θ of greater than 0° to less than 90° with respect to one surface of the first substrate 110.

Accordingly, when the optical path member is used together with a display panel, moire caused by an overlapping phenomenon between a pattern of the display panel and the accommodation part 320 of the optical path member may be alleviated, thereby improving user visibility.

Meanwhile, the optical path control member according to the embodiment may control a magnitude and time of an applied voltage to improve movement characteristics of the light conversion particles.

Hereinafter, the magnitude and time of the voltage applied to the optical path control member capable of improving the movement characteristics of the light conversion particles will be described in detail.

When the optical path control member according to the embodiment is converted into the first mode (privacy mode), the second mode (public mode), and the first mode (privacy mode), the characteristics of the applied voltage are variously changed, so that when the mode is converted from the second mode to the first mode, light shielding characteristics of the optical path control member may be improved, and a driving speed of the optical path control member may be improved.

The optical path control member in a state in which a voltage is not applied maintains the first mode. Subsequently, when a first voltage having a positive voltage is applied to the first electrode 210 or the second electrode 220, the light conversion particles 320b move, so that the optical path control member may be converted into the second mode. In the following description, for convenience of description, a case in which the first voltage is applied to the first electrode 210 will be mainly described.

In detail, when the first voltage having the positive voltage is applied to the first electrode 210, the light conversion particles 320b having a negative charge may move toward the first electrode 210, and the accommodation part 320 to be aggregated in the direction of the first electrode 210. Accordingly, the optical path control member may be converted from the first mode to the second mode.

Subsequently, when the second voltage having a negative voltage is applied to the first electrode 210, the light conversion particles 320b having a negative charge may move in an opposite direction of the first electrode 210 inside the accommodation part 320 and may be dispersed again inside the dispersion liquid 320a. Accordingly, the optical path control member may be converted from the first mode to the second mode.

The optical path control member according to the embodiment is directed to providing a driving method capable of uniformly dispersing the light conversion particles 320b in the dispersion liquid 320a when converting from the second mode (public mode) to the first mode (privacy mode).

First, a method of driving an optical path control member according to a first embodiment will be described.

The optical path control member according to the first embodiment may apply the second voltage having the negative voltage and a third voltage having a pulse voltage together to the electrode when converting from the second mode (public mode) to the first mode (privacy mode). In detail, the second voltage may be first applied, and then the third voltage may be applied thereafter.

The second voltage may move the light conversion particles 320b. In detail, according to the application of the second voltage, the light conversion particles 320b may move in a direction away from the first electrode 210.

A magnitude of the second voltage may be the same as or similar to a magnitude of the first voltage. Here, the magnitude of the first voltage and the magnitude of the second voltage may be defined as a magnitude of an absolute value of the voltage.

In detail, the magnitude of the second voltage may have a magnitude of 50% to 150% of the magnitude of the first voltage. In more detail, the magnitude of the second voltage may have a magnitude of 70% to 130% of the magnitude of the first voltage. In more detail, the magnitude of the second voltage may have a magnitude of 80% to 120% of the magnitude of the first voltage. In more detail, the magnitude of the second voltage may have a magnitude of 90% to 110% of the magnitude of the first voltage. In more detail, the magnitude of the second voltage may have a magnitude of 95% to 105% of the magnitude of the first voltage. In more detail, the magnitude of the second voltage may have a magnitude of 99% to 101% of the magnitude of the first voltage.

For example, the magnitude of the second voltage may have a magnitude of about +35 V to −45 V.

The third voltage may have a pulse voltage that repeats a positive voltage and a negative voltage. The third voltage may disperse the light conversion particles 320b. In detail, according to the application of the third voltage, the light conversion particles 320b may be uniformly dispersed inside the dispersion liquid 320a while repeatedly moving toward the first electrode 210 and the second electrode 220 inside the dispersion liquid 320a.

Magnitudes of the positive voltage and the negative voltage of the third voltage may be the same as or similar to the magnitude of the first voltage. Here, the magnitudes of the positive voltage and the negative voltage of the third voltage may be defined as a magnitude of an absolute value of the voltage.

In addition, the magnitudes of the positive voltage and the negative voltage of the third voltage may be the same as or different from each other.

In detail, the magnitudes of the positive voltage and the negative voltage of the third voltage may have a magnitude of 25% to 150% of the magnitude of the first voltage. In more detail, the magnitudes of the positive voltage and the negative voltage of the third voltage may have a magnitude of 50% to 130% of the magnitude of the first voltage. In more detail, the magnitudes of the positive voltage and the negative voltage of the third voltage may have a magnitude of 80% to 120% of the magnitude of the first voltage. In more detail, the magnitudes of the positive voltage and the negative voltage of the third voltage may have a magnitude of 90% to 110% of the magnitude of the first voltage. In more detail, the magnitude of the positive voltage and the negative voltage of the third voltage may have a magnitude of 95% to 105% of the magnitude of the first voltage. In more detail, the magnitudes of the positive voltage and the negative voltage of the third voltage may have a magnitude of 99% to 101% of the magnitude of the first voltage.

For example, when the first voltage has a magnitude of +35 V to +45 V, the positive voltage of the third voltage may have a magnitude of +10 V to +65 V, and the negative voltage may have a magnitude of −10 V to −65 V.

In addition, a difference in magnitude between the negative voltage and the positive voltage of the third voltage may be the same as or similar to a difference in magnitude between the first voltage and the second voltage.

In detail, the difference in magnitude between the negative voltage and the positive voltage of the third voltage may have a magnitude of 50% to 150% of the difference in magnitude between the first voltage and the second voltage. In more detail, the difference in magnitude between the negative voltage and the positive voltage of the third voltage may have a magnitude of 70% to 130% of the difference in magnitude between the first voltage and the second voltage. In more detail, the difference in magnitude between the negative voltage and the positive voltage of the third voltage may have a magnitude of 80% to 120% of the magnitude difference between the first voltage and the second voltage. In more detail, the difference in magnitude between the negative voltage and the positive voltage of the third voltage may have a magnitude of 90% to 110% of the difference in magnitude between the first voltage and the second voltage. In more detail, the difference in magnitude between the negative voltage and the positive voltage of the third voltage may have a magnitude of 95% to 105% of the difference in magnitude between the first voltage and the second voltage. In more detail, the difference in magnitude between the negative voltage and the positive voltage of the third voltage may have a magnitude of 99% to 101% of the difference in magnitude between the first voltage and the second voltage.

The third voltage may be repeated at a predetermined number of cycles in which the negative voltage and the positive voltage are repeated. For example, in the third voltage, the negative voltage and the positive voltage may be repeated at about 10 to 15 cycles.

Each of the second voltage and the third voltage may be applied at a constant time. In detail, a total application time, which is a sum of an application time of the second voltage and an application time of the third voltage, may be 3 seconds or less. When the sum of the application time of the second voltage and the application time of the third voltage exceeds 3 seconds, a conversion time from the second mode to the first mode of the optical path control member is increased, and thus an overall driving speed of the optical path control member may be reduced.

For example, the application time of the second voltage and the application time of the third voltage may be applied such that the total application time is the same as each other in a range of 3 seconds or the application time of any voltage is large. Preferably, the application time of the third voltage for dispersing the light conversion particles may be greater than the application time of the second voltage.

FIGS. 17 to 20 are views for describing the movement of light conversion particles according to the application of voltage according to the first embodiment.

Figure 17:
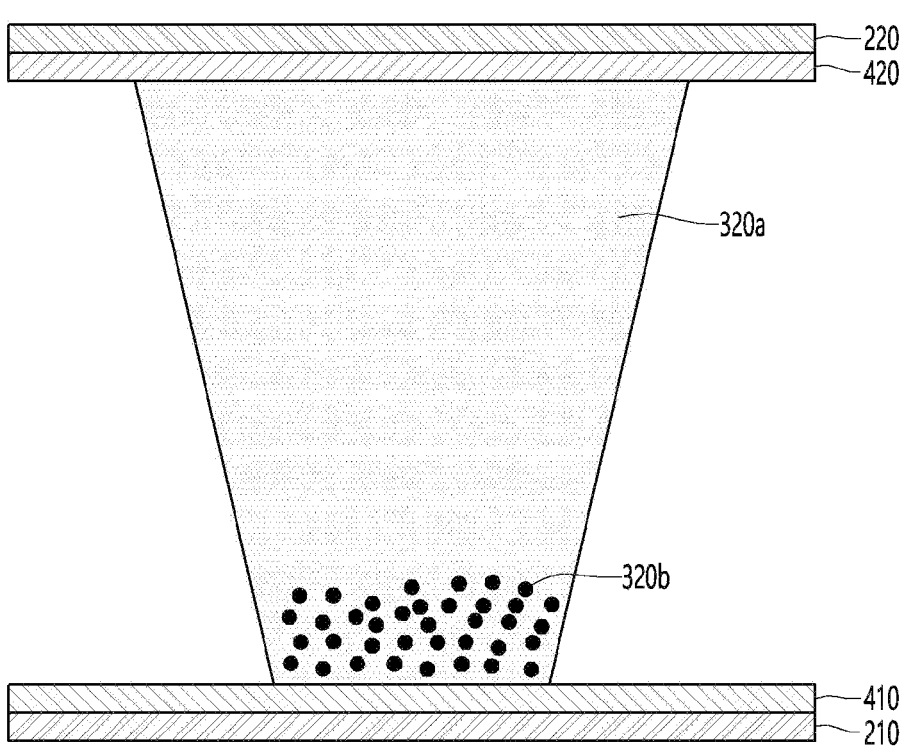
FIGS. 17 to 20 are views for describing a method of driving an optical path control member according to a first embodiment.

Referring to FIG. 17, when the first voltage is applied, the light conversion particles 320b may move toward the first electrode 210.

Figure 18:
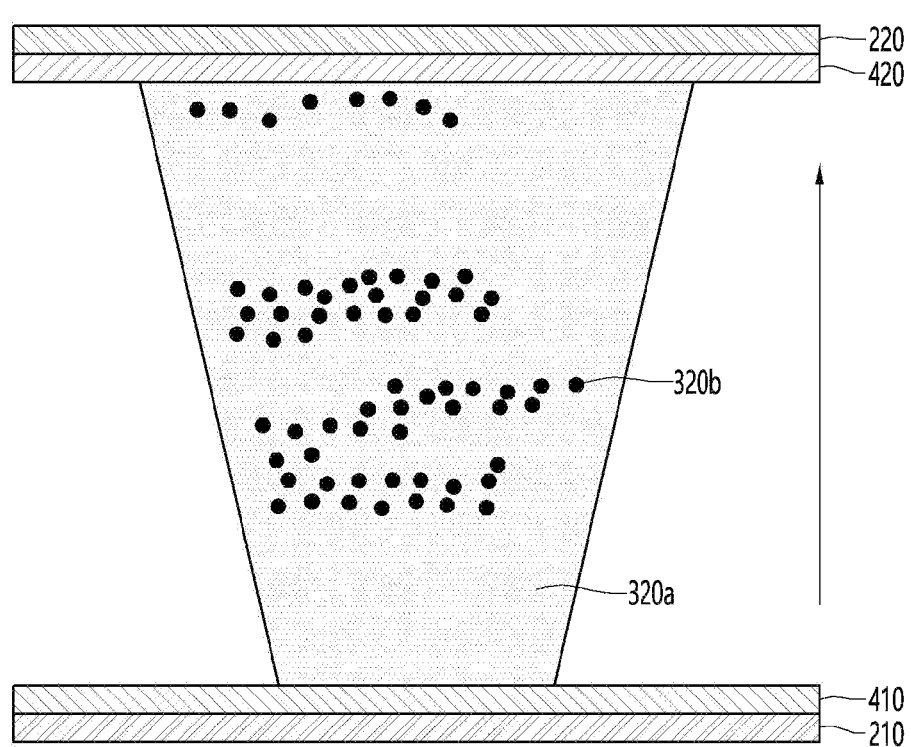

Subsequently, referring to FIG. 18, when the second voltage is applied, the light conversion particles 320b may move in the opposite direction of the first electrode 210 as indicated by an arrow direction. That is, the light conversion particles 320b may move toward the second electrode 220.

Figure 19:
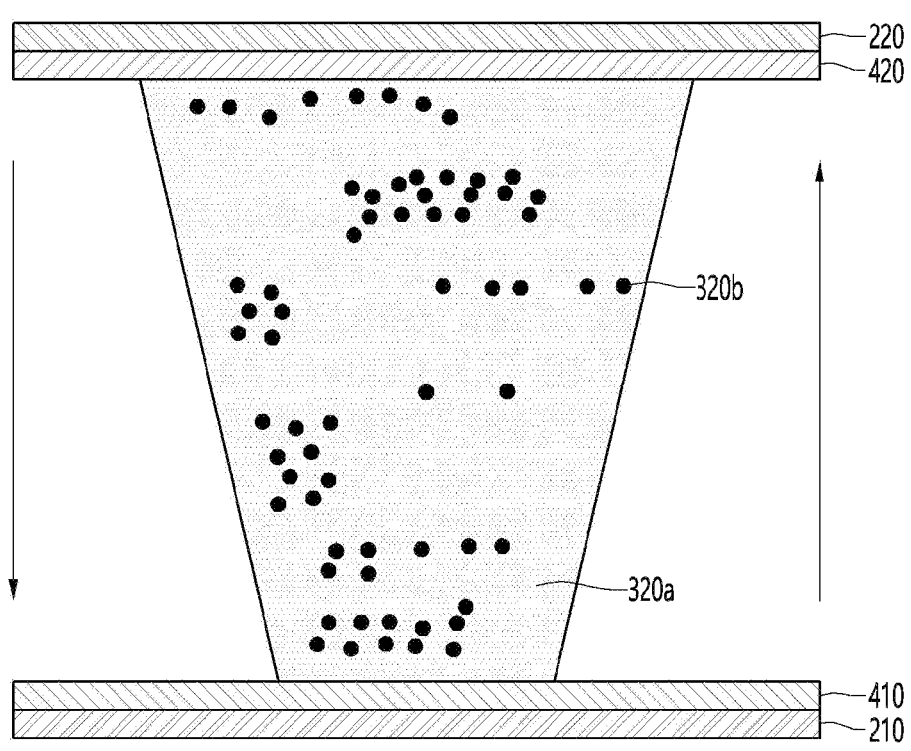

Subsequently, referring to FIG. 19, when the third voltage is applied, the light conversion particles 320b may be dispersed in the dispersion liquid 320 while repeatedly moving toward the first electrode 210 and the second electrode 220 as indicated by the arrow direction.

Figure 20:
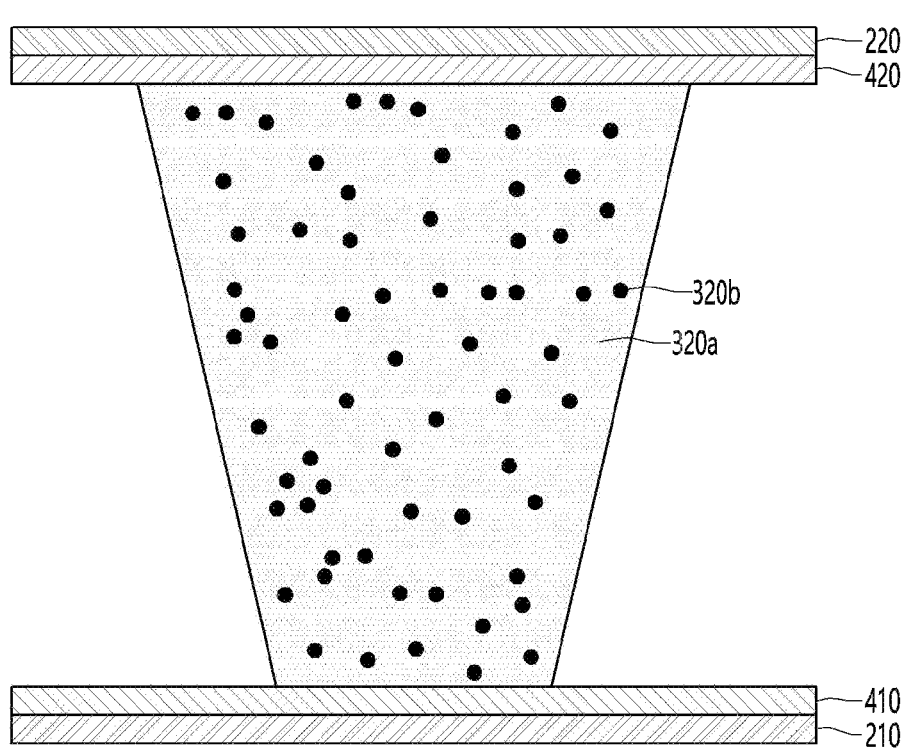

Subsequently, referring to FIG. 20, when 0 V, which is the end of the pulse voltage, is applied, the light conversion particles 320b may be uniformly dispersed in the dispersion liquid 320a.

Hereinafter, a method of driving an optical path control member according to a second embodiment will be described.

The optical path control member according to the second embodiment may apply the second voltage having the negative voltage and the third voltage having the pulse voltage together when converting from the second mode (public mode) to the first mode (privacy mode). In detail, the second voltage may be first applied, and then the third voltage may be applied thereafter.

Except that the method of driving the third voltage is different, the driving method of the optical path control member according to the second embodiment may be the same as the driving method of the optical path control member according to the first embodiment.

In the method of driving the optical path control member according to the second embodiment, the application times of the positive voltage and the negative voltage of the third voltage having the pulse voltage may be different from each other.

In detail, in the second embodiment, the application time of the negative voltage of the third voltage may be greater than the application time of the positive voltage.

For example, a ratio of the application time of the negative voltage and the application time of the positive voltage of the third voltage may be greater than 1:1 to 9:1. In detail, the ratio of the application time of the negative voltage and the application time of the positive voltage of the third voltage may be greater than 1:1 to 7:1. In more detail, the ratio of the application time of the negative voltage and the application time of the positive voltage of the third voltage may be greater than 1:1 to 5:1. In more detail, the ratio of the application time of the negative voltage and the application time of the positive voltage of the third voltage may be greater than 1:1 to 3:1.

The light conversion particles may be uniformly dispersed in various environments by making the application time of the negative voltage and the application time of the positive voltage of the third voltage different. That is, when the magnitude of the second voltage that moves the light conversion particles is applied to be smaller than the desired magnitude, or the application time of the second voltage is applied to be smaller than the desired time, the light conversion particles can be uniformly dispersed in the dispersion liquid by making the time of the negative voltage of the third voltage greater than the time of the positive voltage.

Hereinafter, a method of driving an optical path control member according to a third embodiment will be described.

The optical path control member according to the third embodiment may apply the second voltage having the pulse voltage and the third voltage having the pulse voltage together when converting from the second mode (public mode) to the first mode (privacy mode). In detail, the second voltage may be first applied, and then the third voltage may be applied thereafter. That is, in the optical path control member according to the third embodiment, unlike the first and second embodiments described above, the second voltage may also have the pulse voltage.

The second voltage may have a pulse voltage that repeats a positive voltage and a negative voltage. The second voltage may move and disperse the light conversion particles 320b. In detail, the light conversion particles 320b may move toward the first electrode 210 inside the dispersion liquid 320a according to the application of the negative voltage of the second voltage, and the light conversion particles 320b may be uniformly dispersed inside the dispersion liquid 320a while repeatedly moving toward the first electrode 210 and the second electrode 220 according to the application of the negative voltage and the positive voltage of the second voltage.

That is, the second voltage may be a pulse voltage in which the negative voltage is first applied, and then the positive voltage and the negative voltage are repeated.

Magnitudes of the positive voltage and the negative voltage of the second voltage may be the same as or similar to the magnitude of the first voltage. In addition, a magnitude of an initial negative voltage of the second voltage may be the same as or similar to a magnitude of the positive voltage of the first voltage. Here, the magnitudes of the positive voltage and the negative voltage of the second voltage may be defined as a magnitude of an absolute value of the voltage.

In addition, the magnitudes of the positive voltage and the negative voltage of the second voltage may be the same as or different from each other.

In detail, the magnitude of the positive voltage and the negative voltage of the second voltage may have a magnitude of 25% to 150% of the magnitude of the first voltage. In more detail, the magnitudes of the positive voltage and the negative voltage of the second voltage may have a magnitude of 50% to 130% of the magnitude of the first voltage. In more detail, the magnitudes of the positive voltage and the negative voltage of the second voltage may have a magnitude of 80% to 120% of the magnitude of the first voltage. In more detail, the magnitudes of the positive voltage and the negative voltage of the second voltage may have a magnitude of 90% to 110% of the magnitude of the first voltage. In more detail, the magnitudes of the positive voltage and the negative voltage of the second voltage may have a magnitude of 95% to 105% of the magnitude of the first voltage. In more detail, the magnitude of the positive voltage and the negative voltage of the second voltage may have a magnitude of 99% to 101% of the magnitude of the first voltage.

For example, when the first voltage has a magnitude of +35 V to +45 V, the positive voltage of the second voltage may have a magnitude of +10 V to +65 V, and the negative voltage may have a magnitude of −10 V to −65 V.

In addition, a difference in magnitude between the negative voltage and the positive voltage of the second voltage may be the same as or similar to a difference in magnitude between the initial voltages of the first voltage and the second voltage.

In detail, the difference in magnitude between the negative voltage and the positive voltage of the second voltage may have a magnitude of 50% to 150% of the difference in magnitude between the initial voltages of the first voltage and the second voltage. In more detail, the difference in magnitude between the negative voltage and the positive voltage of the second voltage may have a magnitude of 70% to 130% of the difference in magnitude between the initial voltages of the first voltage and the second voltage. In more detail, the difference in magnitude between the negative voltage and the positive voltage of the second voltage may have a magnitude of 80% to 120% of the difference in magnitude between the initial voltages of the first voltage and the second voltage. In more detail, the difference in magnitude between the negative voltage and the positive of the second voltage may have a magnitude of 90% to 110% of the difference in magnitude between the initial voltages of the first voltage and the second voltage. In more detail, the difference in magnitude between the negative voltage and the positive voltage of the second voltage may have a magnitude of 95% to 105% of the difference in magnitude between the initial voltages of the first voltage and the second voltage. In more detail, the difference in magnitude between the negative voltage and the positive voltage of the second voltage may have a magnitude of 99% to 101% of the difference in magnitude between the initial voltages of the first voltage and the second voltage.

The second voltage may be repeated at a predetermined number of cycles in which the negative voltage and the positive voltage are repeated. For example, in the second voltage, the negative voltage and the positive voltage may be repeated at about 3 to 5 cycles.

The application time of the negative voltage and the application time of the positive voltage of the second voltage may be different.

In the second voltage, the application time of the negative voltage may be greater than the application time of the positive voltage.

For example, a ratio of the application time of the negative voltage and the application time of the positive voltage of the second voltage may be greater than 1:1 to 9:1. In detail, a ratio of the application time of the negative voltage and the application time of the positive voltage of the second voltage may be greater than 1:1 to 8:1. In more detail, a ratio of the application time of the negative voltage and the application time of the positive voltage of the second voltage may be greater than 1:1 to 7:1.

The third voltage may have the pulse voltage that repeats the positive voltage and the negative voltage. The third voltage may disperse the light conversion particles 320*b*. In detail, according to the application of the third voltage, the light conversion particles 320*b* may be uniformly dispersed inside the dispersion liquid 320*a* while repeatedly moving in the direction of the first electrode 210 and the direction of the second electrode 220 inside the dispersion liquid 320*a*.

The magnitudes of the positive voltage and the negative voltage of the third voltage may be the same as or similar to the magnitude of the first voltage. Here, the magnitudes of the positive voltage and the negative voltage of the third voltage may be defined as a magnitude of an absolute value of the voltage.

In addition, the magnitudes of the positive voltage and the negative voltage of the third voltage may be the same as or different from each other.

In detail, the magnitudes of the positive voltage and the negative voltage of the third voltage may have a magnitude of 25% to 150% of the magnitude of the first voltage. In more detail, the magnitudes of the positive voltage and the negative voltage of the third voltage may have a magnitude of 50% to 130% of the magnitude of the first voltage. In more detail, the magnitudes of the positive voltage and the negative voltage of the third voltage may have a magnitude of 80% to 120% of the magnitude of the first voltage. In more detail, the magnitudes of the positive voltage and the negative voltage of the third voltage may have a magnitude of 90% to 110% of the magnitude of the first voltage. In more detail, the magnitude of the positive voltage and the negative voltage of the third voltage may have a magnitude of 95% to 105% of the magnitude of the first voltage. In more detail, the magnitudes of the positive voltage and the negative voltage of the third voltage may have a magnitude of 99% to 101% of the magnitude of the first voltage.

For example, when the first voltage has a magnitude of +35 V to +45 V, the positive voltage of the third voltage may have a magnitude of +10 V to +65 V, and the negative voltage may have a magnitude of −10 V to −65 V.

In addition, the difference in magnitude between the negative voltage and the positive voltage of the third voltage may be the same as or similar to the difference in magnitude between the first voltage and the second voltage.

In detail, the difference in magnitude between the negative voltage and the positive voltage of the third voltage may have a magnitude of 50% to 150% of the difference in magnitude between the initial voltages of the first voltage and the second voltage. In more detail, the difference in magnitude between the negative voltage and the positive voltage of the third voltage may have a magnitude of 70% to 130% of the difference in magnitude between the initial voltages of the first voltage and the second voltage. In more detail, the difference in magnitude between the negative voltage and the positive voltage of the third voltage may have a magnitude of 80% to 120% of the difference in magnitude between the magnitudes of the initial voltages of the first voltage and the second voltage. In more detail, the difference in magnitude between the negative voltage and the positive voltage of the third voltage may have a magnitude of 90% to 110% of the difference in magnitude between the initial voltages of the first voltage and the second voltage. In more detail, the difference in magnitude between the negative voltage and the positive voltage of the third voltage may have a magnitude of 95% to 105% of the difference in magnitude between the initial voltages of the first voltage and the second voltage. In more detail, the difference in magnitude between the negative voltage and the positive voltage of the third voltage may have a magnitude of 99% to 101% of the difference in magnitude between the initial voltages of the first voltage and the second voltage.

The third voltage may be repeated at a predetermined number of cycles in which the negative voltage and the positive voltage are repeated. The number of cycles of the third voltage may be different from the number of cycles of the second voltage. In detail, the number of cycles of the third voltage may be greater than the number of cycles of the second voltage.

For example, in the third voltage, the negative voltage and the positive voltage may be repeated at about 7 to 13 cycles.

Each of the second voltage and the third voltage may be applied at a constant time. In detail, the total application time, which is the sum of the application time of the second voltage and the application time of the third voltage, may be 3 seconds or less. When the sum of the application time of the second voltage and the application time of the third voltage exceeds 3 seconds, the conversion time from the second mode to the first mode of the optical path control member is increased, and thus an overall driving speed of the optical path control member may be reduced.

For example, the application time of the second voltage and the application time of the third voltage may be applied to be equal to each other or the application time of a certain voltage may be applied to be large in a range in which the total application time is within 3 seconds. Preferably, the application time of the third voltage for dispersing the light conversion particles may be greater than the application time of the second voltage.

FIGS. 21 to 25 are views for describing the movement of light conversion particles according to the application of voltage according to the third embodiment.

Figure 21:
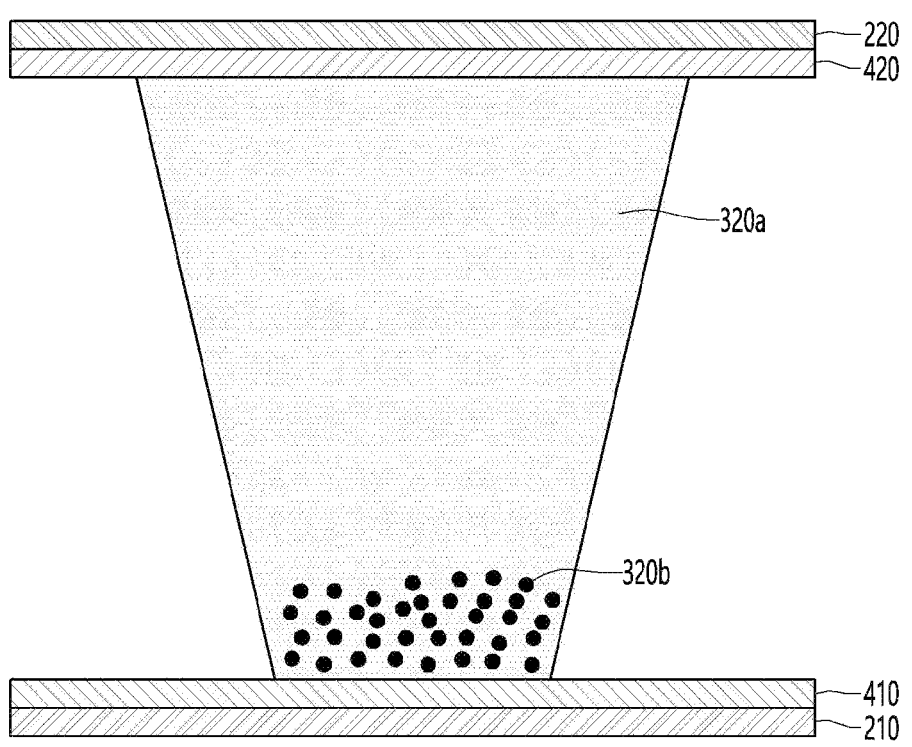
FIGS. 21 to 25 are views for describing a method of driving an optical path control member according to a third embodiment.

Referring to FIG. 21, when the first voltage is applied, the light conversion particles 320*b* may move toward the first electrode 210.

Figure 22:
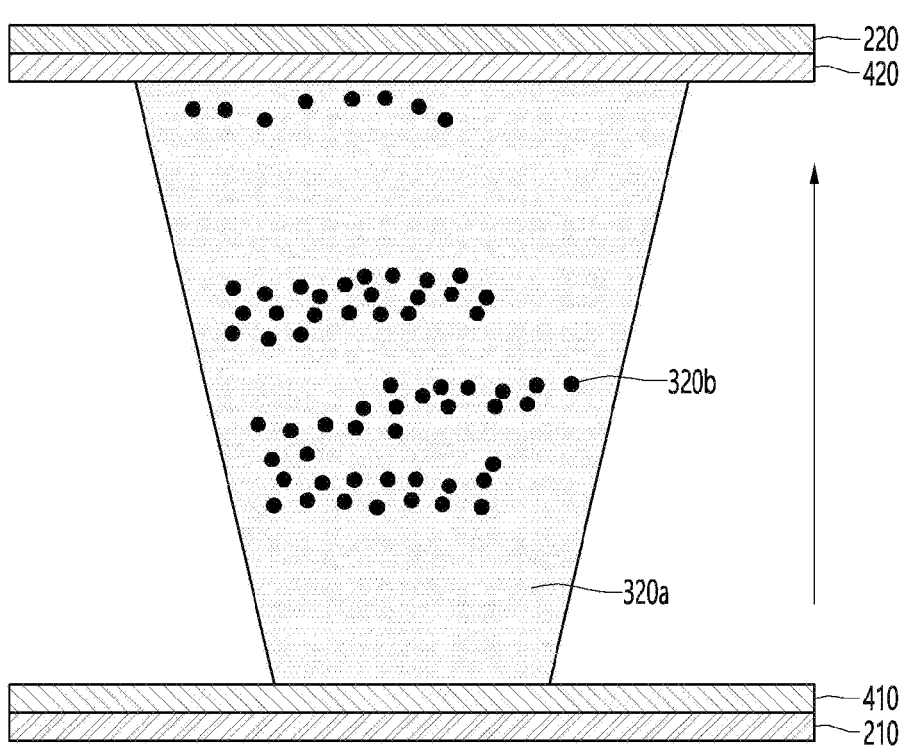
Figure 23:
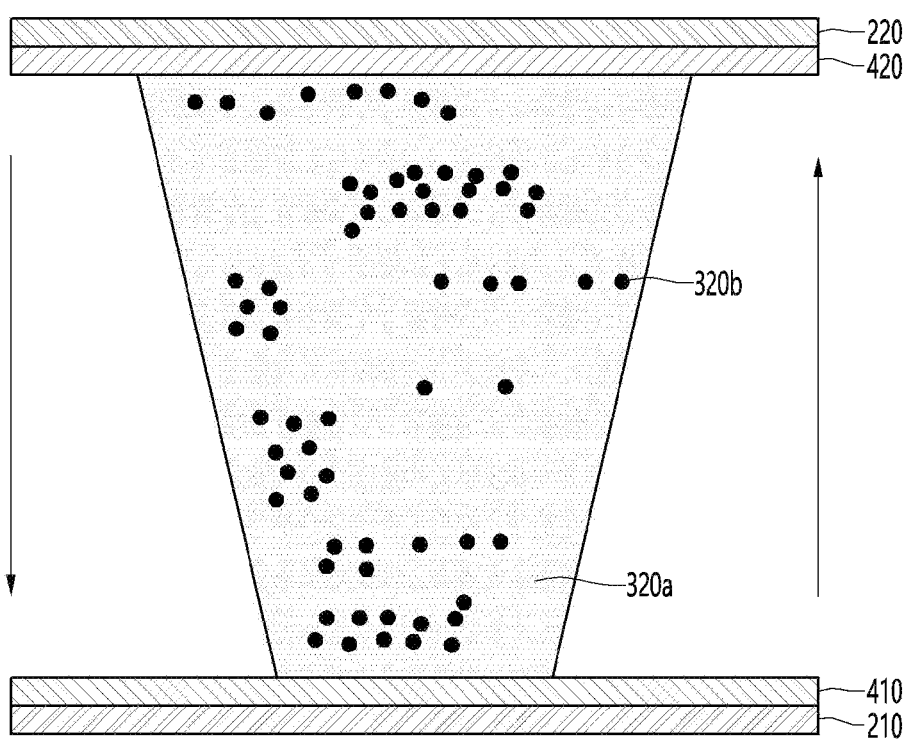

Subsequently, referring to FIGS. 22 and 23, when the second voltage is applied, the light conversion particles 320*b* may move in the opposite direction of the first electrode 210 as indicated by an arrow direction of FIG. 22. That is, the light conversion particles 320*b* may move toward the second electrode 220. In addition, referring to FIG. 23, the light conversion particles 320*b* may be dispersed in the dispersion liquid 320 while repeatedly moving toward the first electrode 210 and the second electrode 220 as indicated by arrow directions.

Figure 24:
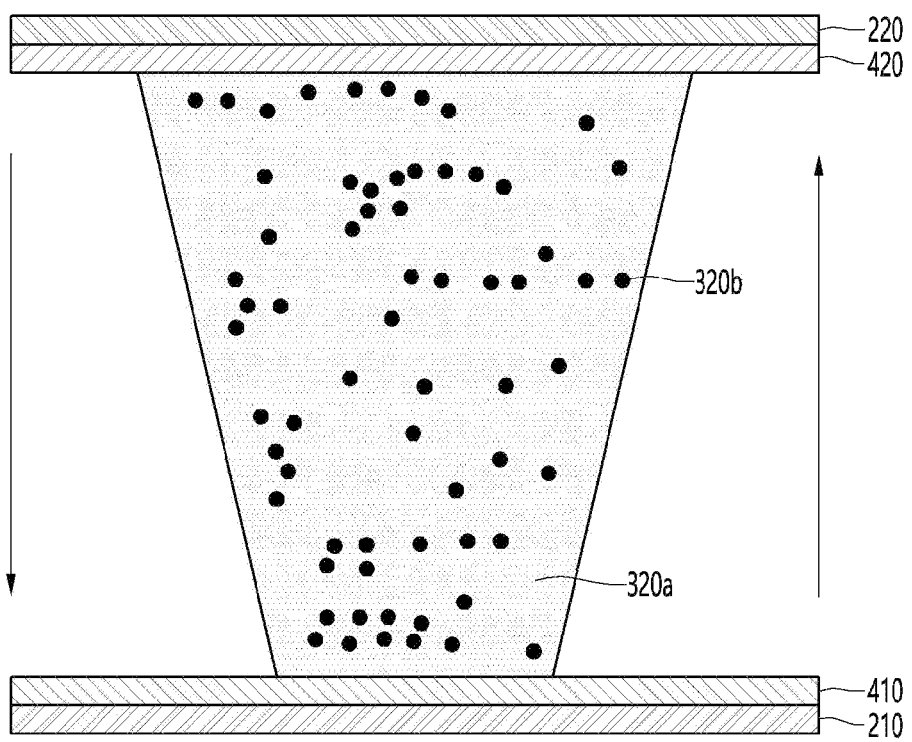

Subsequently, referring to FIG. 24, when the third voltage is applied, the light conversion particles 320*b* may be dispersed in the dispersion liquid 320 while repeatedly moving toward the first electrode 210 and the second electrode 220 as indicated by arrow directions.

Figure 25:
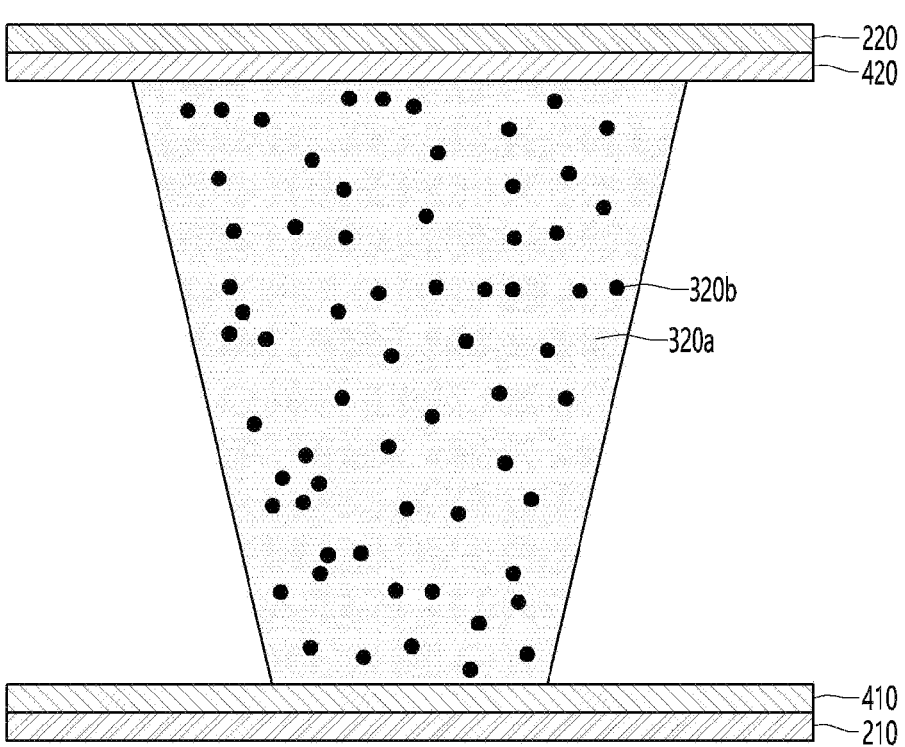

Subsequently, referring to FIG. 25, when 0 V, which is the end of the pulse voltage, is applied, the light conversion particles 320*b* may be uniformly dispersed in the dispersion liquid 320*a*.

Hereinafter, a method of driving an optical path control member according to a fourth embodiment will be described.

The optical path control member according to the fourth embodiment may apply the second voltage having the negative voltage and the third voltage having the pulse voltage together to the electrode when converting from the second mode (public mode) to the first mode (privacy mode). In detail, the second voltage may be first applied, and then the third voltage may be applied thereafter.

Except that the method of driving the third voltage is different, the driving method of the optical path control member according to the fourth embodiment may be the same as the driving method of the optical path control member according to the third embodiment.

In the method of driving the optical path control member according to the fourth embodiment, the application times of the positive voltage and the negative voltage of the third voltage having the pulse voltage may be different from each other.

In detail, in the fourth embodiment, the application time of the negative voltage of the third voltage may be greater than the application time of the positive voltage.

For example, a ratio of the application time of the negative voltage and the application time of the positive voltage of the third voltage may be greater than 1:1 to 9:1. In detail, the ratio of the application time of the negative voltage and the application time of the positive voltage of the third voltage may be greater than 1:1 to 7:1. In more detail, the ratio of the application time of the negative voltage and the application time of the positive voltage of the third voltage may be greater than 1:1 to 5:1. In more detail, the ratio of the application time of the negative voltage and the application time of the positive voltage of the third voltage may be greater than 1:1 to 3:1.

The light conversion particles may be uniformly dispersed in various environments by making the application time of the negative voltage and the application time of the positive voltage of the third voltage different. That is, when the magnitude of the second voltage that moves the light conversion particles is applied to be smaller than the desired magnitude, or the application time of the second voltage is applied to be smaller than the desired time, the light conversion particles can be uniformly dispersed in the dispersion liquid by making the time of the negative voltage of the third voltage greater than the time of the positive voltage.

The optical path control member according to the embodiments may improve the dispersibility of the light conversion particles when converting from the second mode (public mode) to the first mode (privacy mode), thereby improving shielding characteristics in the first mode.

That is, since a step of dispersing the light conversion particles by applying the pulse voltage is included, the light conversion particles are more uniformly dispersed inside the dispersion liquid in the second mode, so that a light transmittance in the first mode of the optical path control member light transmittance may be reduced.

Accordingly, the driving characteristics and driving speed of the optical path control member may be improved.

Hereinafter, the present invention will be described in more detail by measuring a transmittance of the optical path control member according to Examples and Comparative Examples. Such embodiments are merely presented as examples in order to describe the present invention in more detail. Therefore, the present invention is not limited thereto.

Meanwhile, the light transmittance of the optical path control member described below may be defined as a light transmittance measured by (B/A)*100 after measuring a brightness A of light emitted from a light source in a state in which the optical path control member is not disposed and a brightness B of light emitted at an angle of 45° through the optical path control member from the light source in a state in which the optical path control member is disposed on the light source.

In addition, the pulse voltage applied to the optical path control member described below may be measured by checking an on/off voltage of the oscilloscope device. That is, voltage application patterns of both electrodes were measured by connecting voltage measurement terminals to the both electrodes using the oscilloscope device.

Example 1

A first light transmittance in an initial mode in which a voltage was not applied was measured.

Then, a voltage of +40 V was applied to the optical path control member in the initial mode to which a voltage was not applied to convert the optical path control member into the public mode.

Then, a voltage of −40 V was applied for a time of 1.4 seconds, and a pulse voltage with negative and positive voltages of −20 V and −10 V was repeated as many as 13 cycles for 1.6 seconds, and then the voltage was adjusted to 0 V to convert the optical path control member into a privacy mode.

When the optical path control member has been completely switched to the privacy mode, a separate voltage was not applied to the optical path control member.

Then, a second light transmittance in the privacy mode was measured.

Then, a difference between the second light transmittance and the first light transmittance was measured.

Example 2

Except that a pulse voltage with negative and positive voltages of −20 V and +20 V was repeated as many as 13 cycles for 1.6 seconds, and then the voltage was adjusted to 0 V to convert the optical path control member into the privacy mode, the difference between the second light transmittance and the first light transmittance was measured in the same manner as in Example 1.

Example 3

Except that a voltage of −40 V was applied for a time of 1.6 seconds, and a pulse voltage with negative and positive voltages of −20 V and +20 V was repeated as many as 12 cycles for 1.4 seconds, and then the voltage was adjusted to 0 V to convert the optical path control member into the privacy mode, the difference between the second light transmittance and the first light transmittance was measured in the same manner as in Example 1.

Example 4

Except that a voltage of −40 V was applied for a time of 1.6 seconds, and a pulse voltage with negative and positive voltages of −40 V and +40 V was repeated as many as 12 cycles for 1.4 seconds, and then the voltage was adjusted to 0 V to convert the optical path control member into the privacy mode, the difference between the second light transmittance and the first light transmittance was measured in the same manner as in Example 1.

Example 5

A first light transmittance in an initial mode in which a voltage was not applied was measured.

Then, a pulse voltage with negative and positive voltages of −40 V and +40 V was applied to the optical path control member in the initial mode to which a voltage was not applied.

In this case, a ratio of an application time of the negative voltage of −40 V to an application time of the positive voltage of +40 V was set at 7:1, and the pulse voltage was repeated at 4 cycles.

The pulse voltage with negative and positive voltages of −40 V and +40 V was repeated as many as 9 cycles for 1.1 seconds, and then the voltage was adjusted to 0 V to convert the optical path control member into the privacy mode.

Then, a second light transmittance in the privacy mode was measured.

Then, a difference between the second light transmittance and the first light transmittance was measured.

Example 6

Except that the ratio of the application time of the negative voltage of −40 V to the application time of the positive voltage of +40 was set at 8:1, and the pulse voltage was repeated at 3 cycles, and the pulse voltage with negative and positive voltages of −40 V and +40 V was repeated as many as 9 cycles for 1.6 seconds, and then the voltage was adjusted to 0 V to convert the optical path control member into the privacy mode, the difference between the second light transmittance and the first light transmittance was measured in the same manner as in Example 5.

Example 7

Except that the ratio of the application time of the negative voltage of −40 V and the application time of the positive voltage of +40 V was set at 9:1, and the pulse voltage was repeated at 3 cycles, and the pulse voltage with negative and positive voltages of −40 V and +40 V was repeated as many as 10 cycles for 1.4 seconds, and then the voltage was adjusted to 0 V to convert the optical path control member into the privacy mode, the difference between the second light transmittance and the first light transmittance was measured in the same manner as in Example 5.

Comparative Example 1

A first light transmittance in an initial mode in which a voltage was not applied was measured.

Then, a voltage of +40 V was applied to the optical path control member in the initial mode to which a voltage was not applied to convert the optical path control member into the public mode.

Then, a voltage of −40 V was applied for a time of 1.5 seconds to convert the optical path control member into the privacy mode.

Then, a second light transmittance in the privacy mode was measured.

Then, the difference between the second light transmittance and the first light transmittance was measured.

Comparative Example 2

The difference between the second light transmittance and the first light transmittance was measured in the same manner as in Comparative Example 1, except that the optical path control member was converted into the privacy mode by applying a voltage of −40 V for a time of 1.6 seconds.

TABLE 1

|  | Light transmittance difference (%) |
| --- | --- |
| Example 1 | 1.9 |
| Example 2 | 1.9 |
| Example 3 | 1.4 |
| Example 4 | 1.4 |
| Example 5 | 1.7 |
| Example 6 | 0.93 |
| Example 7 | 0.97 |
| Comparative Example 1 | 4.61 |
| Comparative Example 2 | 4.30 |

FIGS. 26 to 34 are views showing a change in voltage and a flow of a pulse voltage according to Examples and Comparative Examples.

Figure 26:
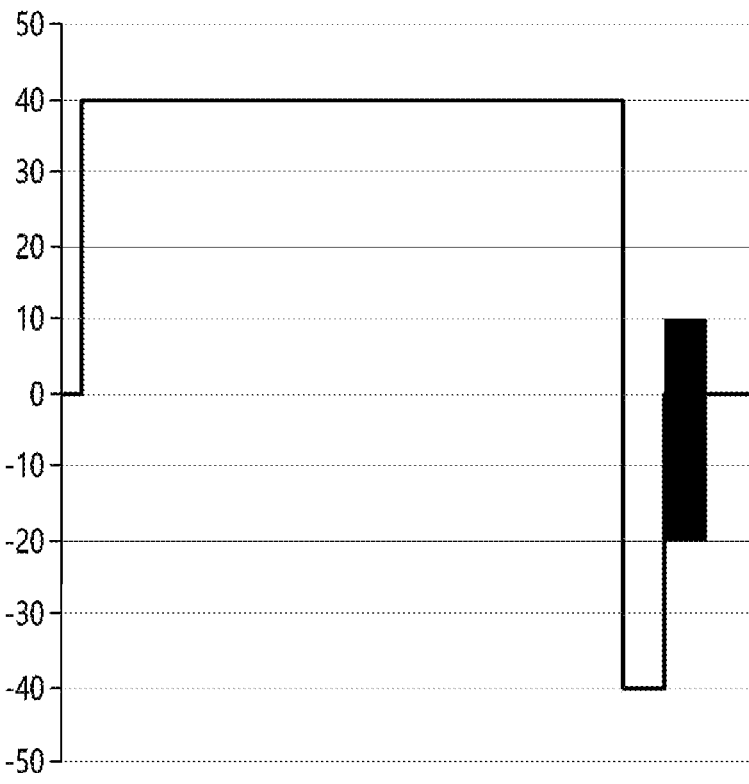
FIGS. 26 to 34 are views showing changes in voltage according to Examples and Comparative Examples.
Figure 27:
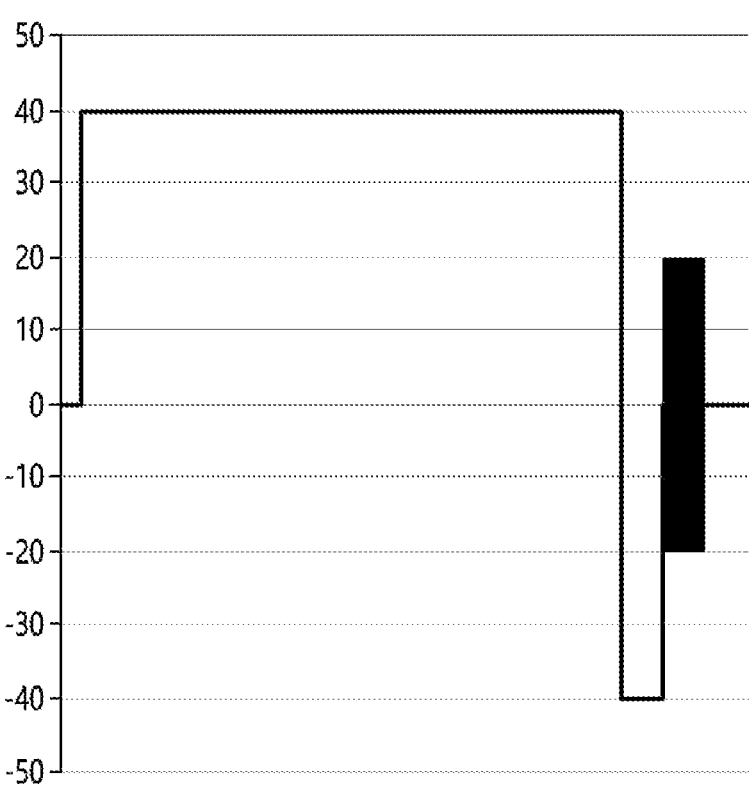
Figure 28:
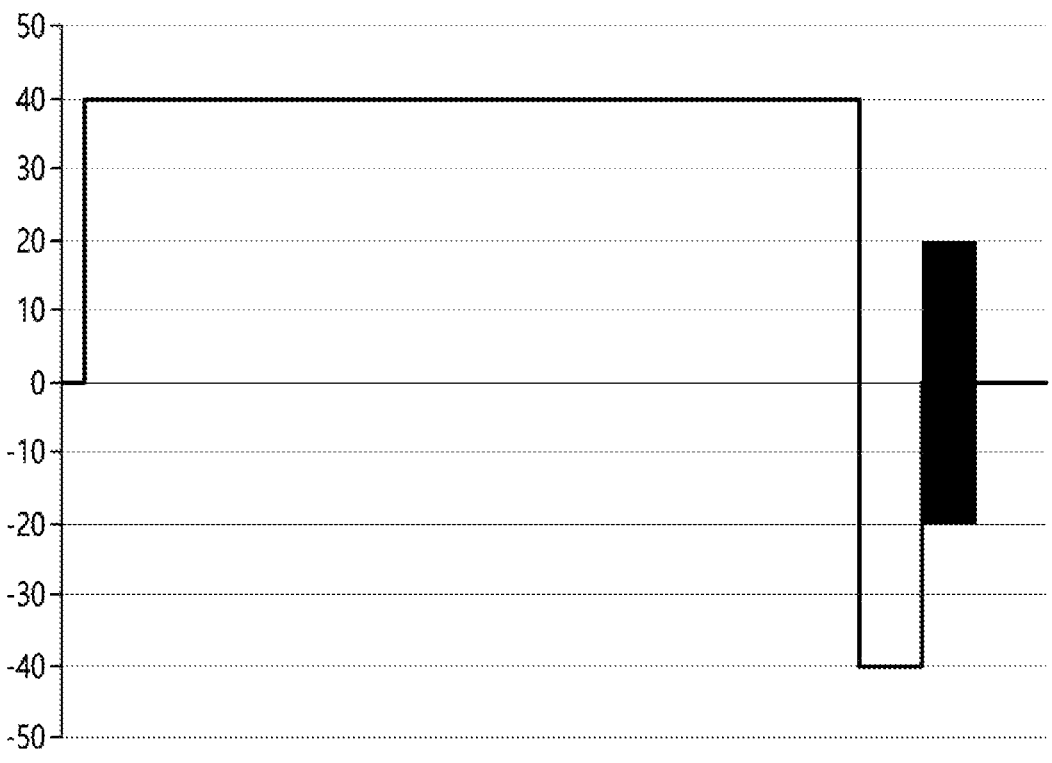
Figure 29:
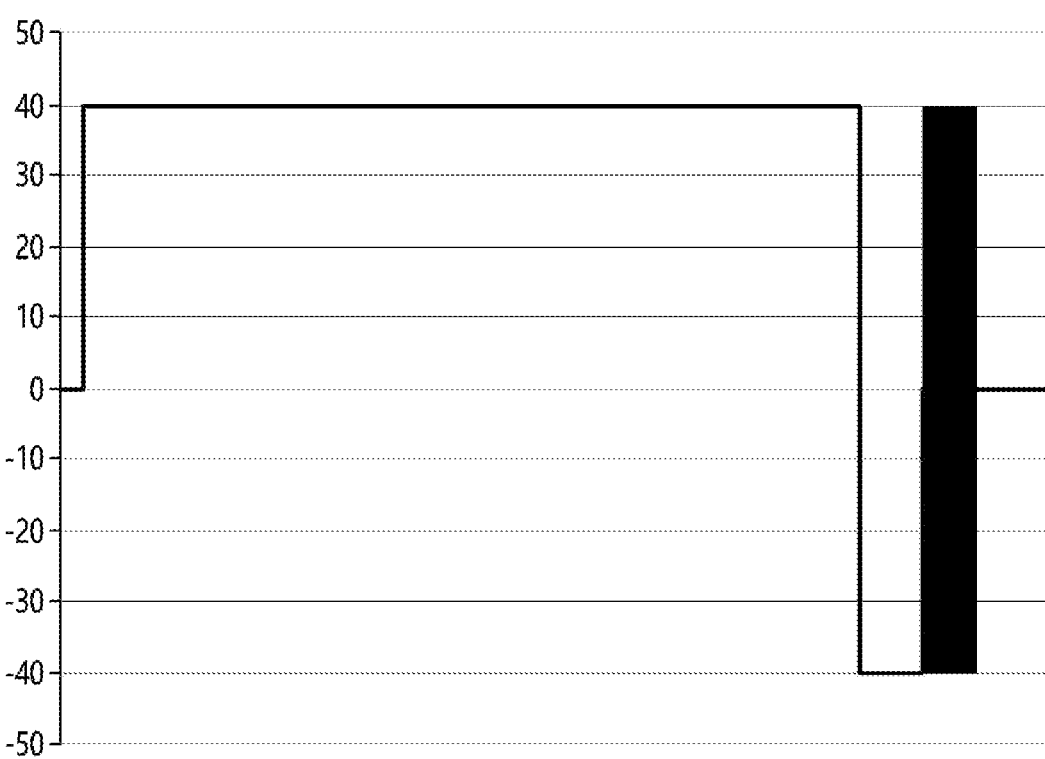
Figure 30:
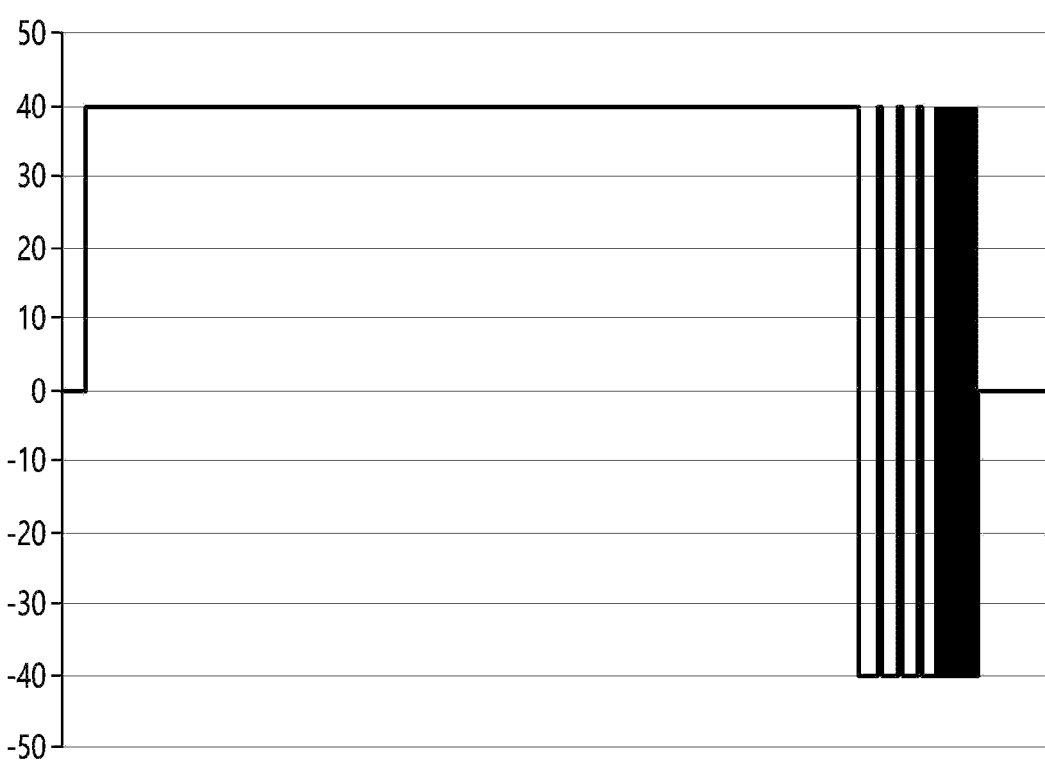
Figure 31:
Figure 32:
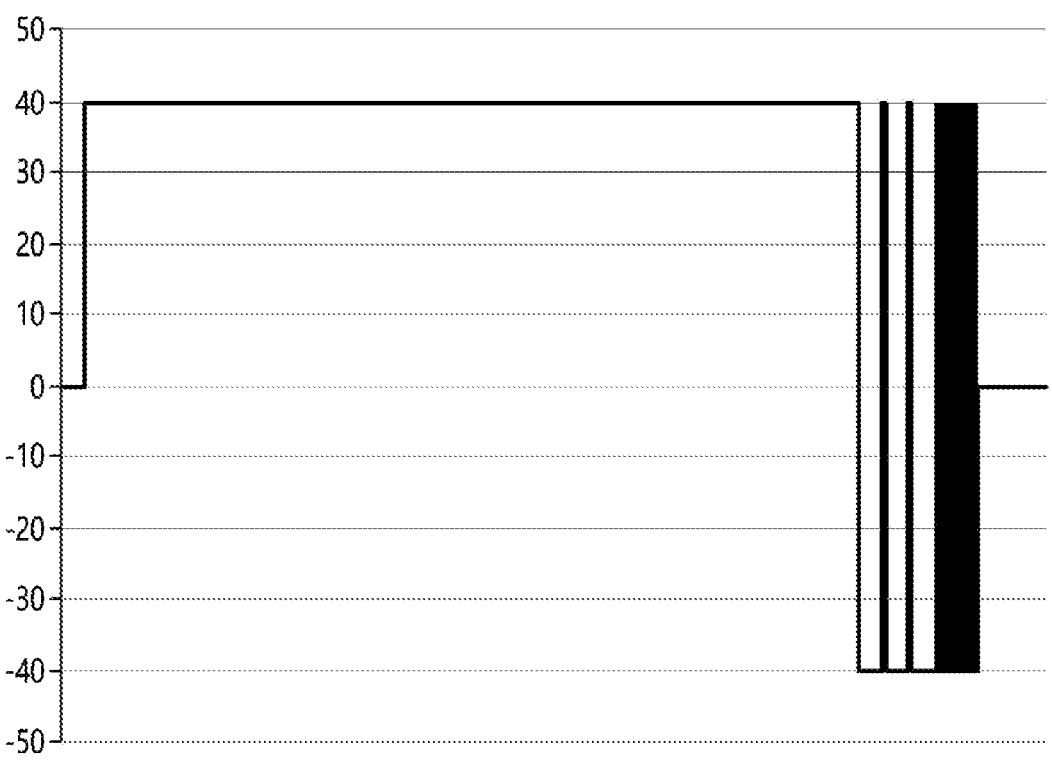
Figure 33:
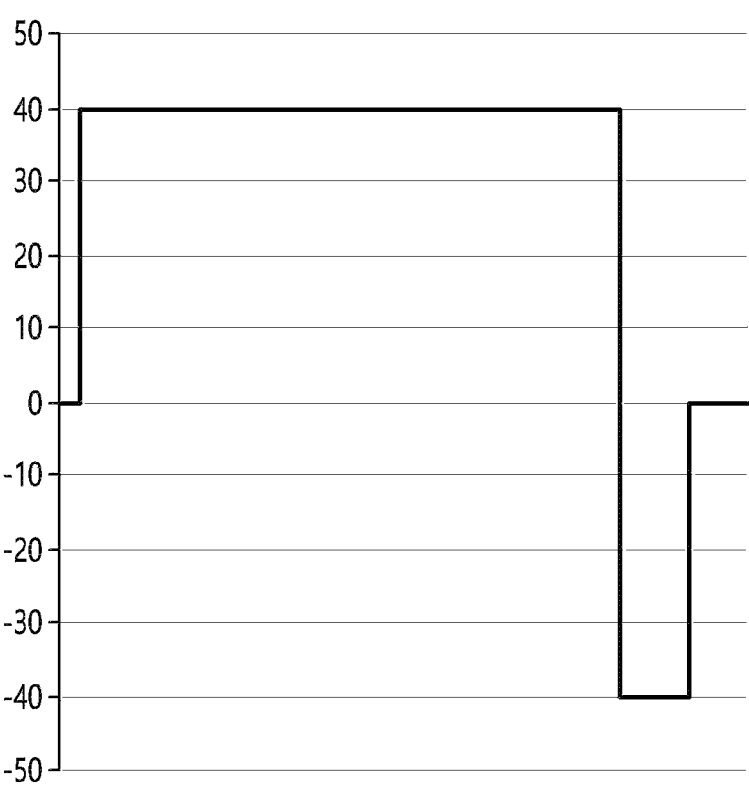
Figure 34:
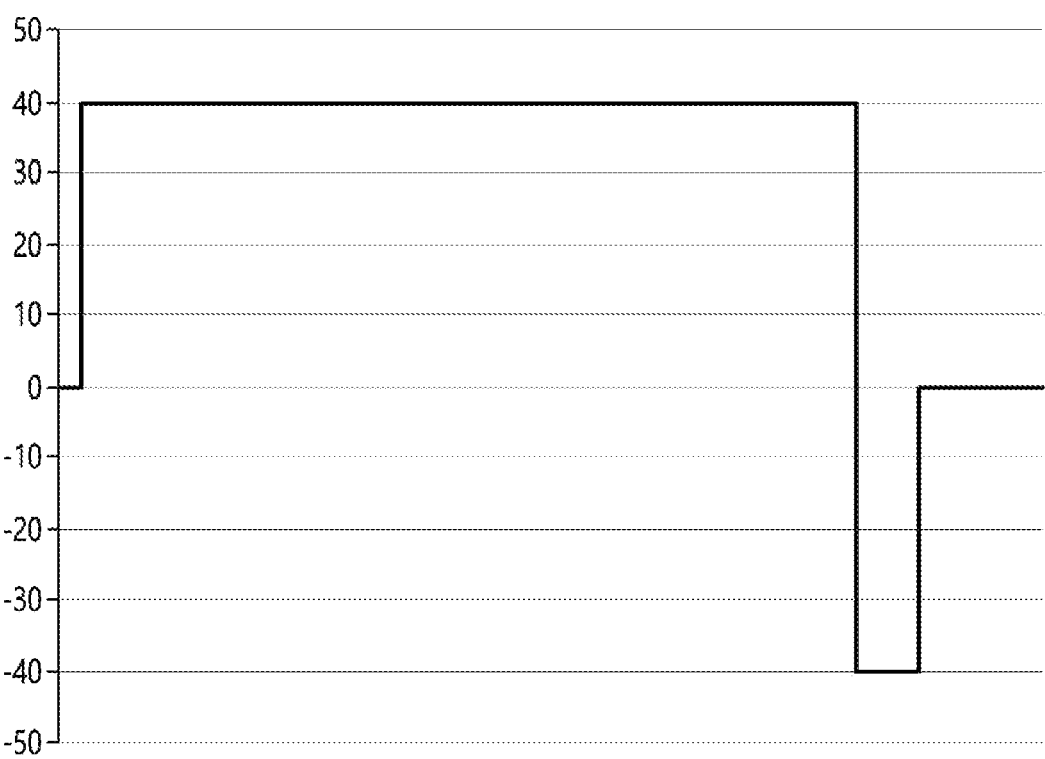

In detail, FIG. 26 is a view for Example 1, FIG. 27 is a view for Example 2, FIG. 28 is a view for Example 3, FIG. 29 is a view for Example 4, FIG. 30 is a view for Example 5, FIG. 31 is a view for Example 6, FIG. 32 is a view for Example 7, FIG. 33 is a view for Comparative Example 1, and FIG. 34 is a view for Comparative Example 2. In addition, in FIGS. 26 to 34, an X-axis represents time (seconds), and a Y-axis represents voltage (V).

Referring to Table 1, it can be seen that the difference between the second light transmittance and the first light transmittance of the optical path control member according to Examples is smaller than that of the optical path control member according to Comparative Examples. That is, it can be seen that a light transmittance in the privacy mode is substantially similar to a light transmittance in the initial mode in the optical path control member according to Examples.

That is, in the optical path control member according to Examples, the dispersion of the light conversion particles become uniform within about 3 seconds when converting from the public mode into the privacy mode by using the pulse voltage appropriately, so that the light transmittance in the privacy mode may be reduced.

That is, the optical path control member according to the embodiment may control the difference in light transmittance between the privacy mode and the initial mode to 4% or less, specifically, 3% or less, more specifically, 2% or less, more specifically, 1% or less.

In other words, it is possible to control the difference between the light transmittance in the initial mode and the light transmittance when converted into the privacy mode after conversion into the public mode to 4% or less, specifically, 3% or less, more specifically, 2% or less, more specifically, 1% or less.

That is, the optical path control member according to the embodiment may improve the driving speed and driving characteristics of the optical path control member by using the pulse voltage.

Hereinafter, referring to FIGS. 35 to 39, a display device and a display apparatus to which an optical path control member according to an embodiment is applied will be described.

Figure 35:
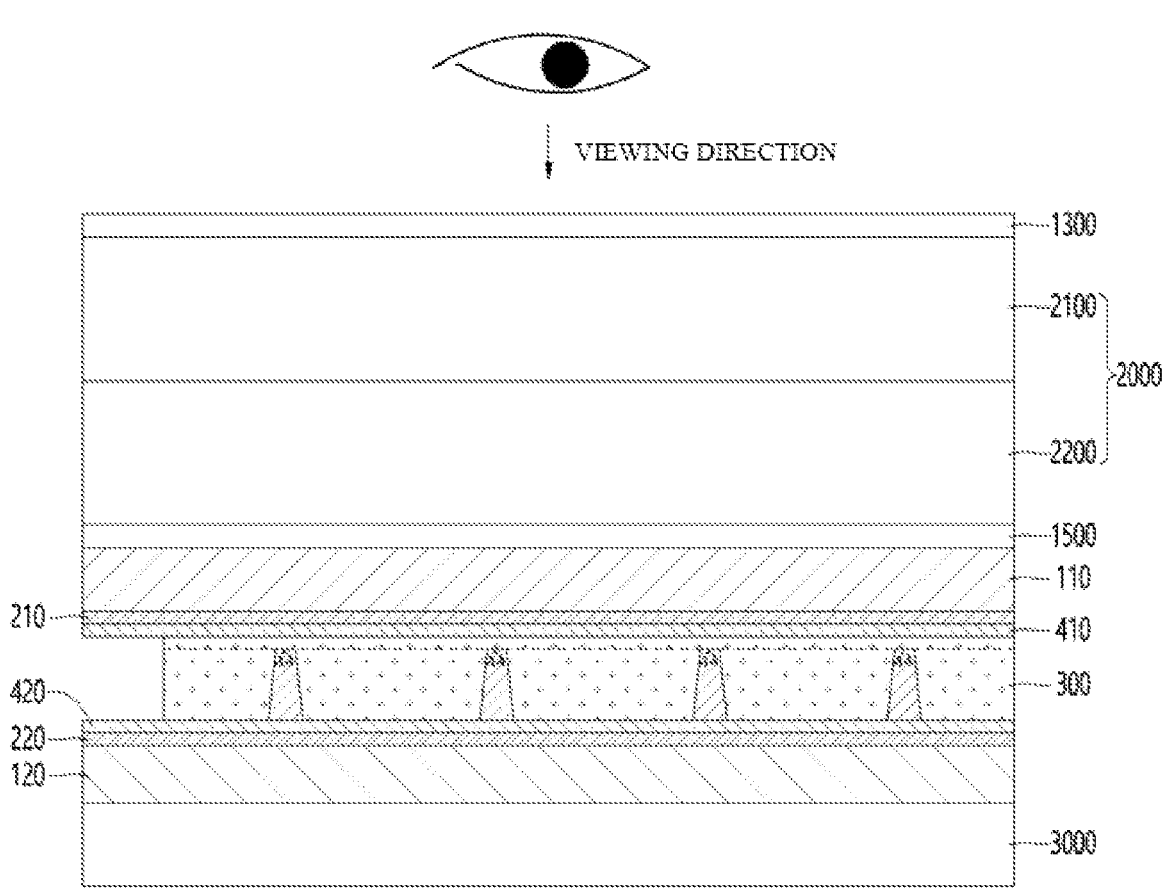
FIGS. 35 and 36 are cross-sectional views of a display device to which an optical path control member according to an embodiment is applied.
Figure 36:
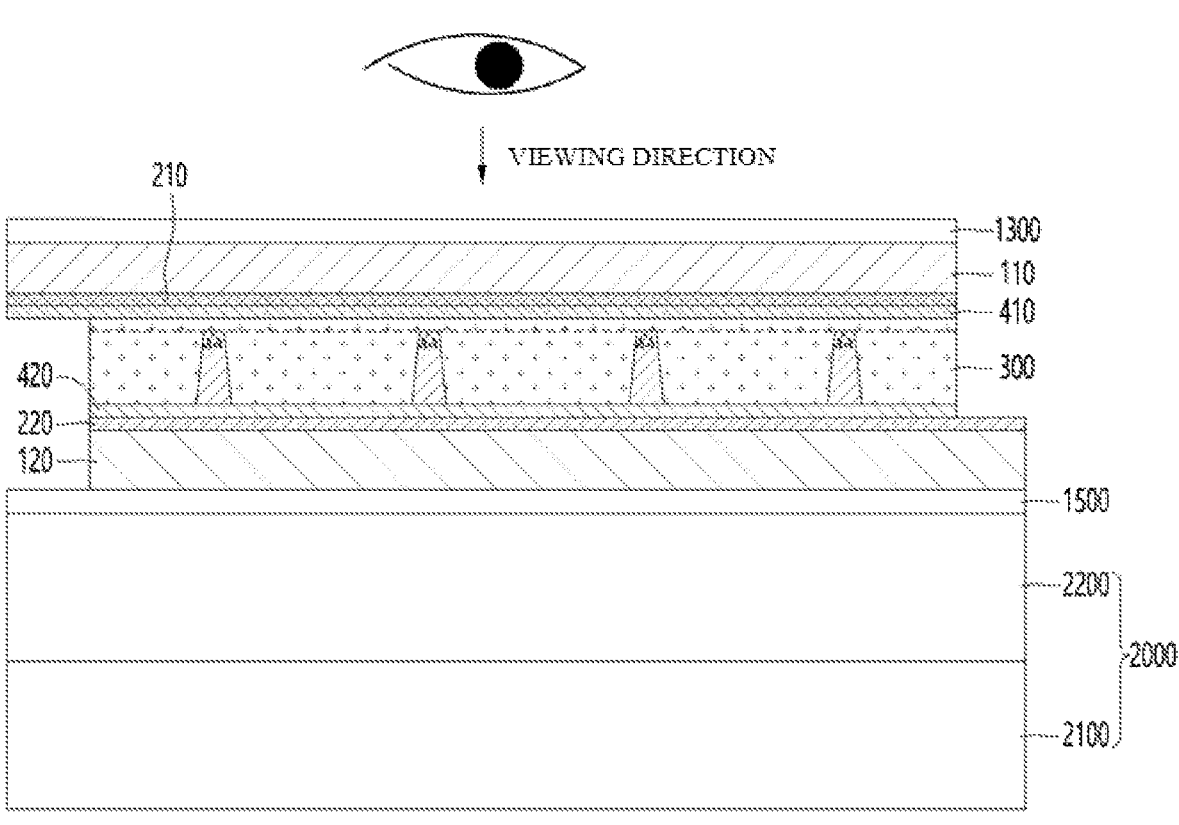

Referring to FIGS. 35 and 36, an optical path control member 1000 according to an embodiment may be disposed on or under a display panel 2000.

The display panel 2000 and the optical path control member 1000 may be disposed to be adhered to each other. For example, the display panel 2000 and the optical path control member 1000 may be adhered to each other via an adhesive layer 1500. The adhesive layer 1500 may be transparent. For example, the adhesive layer 1500 may include an adhesive or an adhesive layer including an optical transparent adhesive material.

The adhesive layer 1500 may include a release film. In detail, when adhering the optical path control member and the display panel, the optical path control member and the display panel may be adhered after the release film is removed.

Meanwhile, referring to FIGS. 35 and 36, one end or one end and the other end of the optical path control member may protrude, and the light conversion unit may not be disposed at the protruding portion. The protrusion region is an electrode connection portion in which the first electrode 210 and the second electrode 220 are exposed, and may connect an external printed circuit board and the optical path control member through the electrode connection portion.

The display panel 2000 may include a first' substrate 2100 and a second' substrate 2200. When the display panel 2000 is a liquid crystal display panel, the optical path control member may be formed under the liquid crystal panel. That is, when a surface viewed by the user in the liquid crystal panel is defined as an upper portion of the liquid crystal panel, the optical path control member may be disposed under the liquid crystal panel. The display panel 2000 may be formed in a structure in which the first' substrate 2100 including a thin film transistor (TFT) and a pixel electrode and the second' substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first' substrate 2100 and the second' substrate 2200 is bonded to the first' substrate 2100 with the liquid crystal layer interposed therebetween. That is, a thin film transistor may be formed on the first' substrate 2100, a protective film may be formed on the thin film transistor, and a color filter layer may be formed on the protective film. In addition, a pixel electrode in contact with the thin film transistor may be formed on the first' substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 35, the optical path control member may be disposed under the liquid crystal panel and on the backlight unit 3000, and the optical path control member may be disposed between the backlight unit 3000 and the display panel 2000.

Alternatively, as shown in FIG. 36, when the display panel 2000 is an organic light emitting diode panel, the optical path control member may be formed on the organic light emitting diode panel. That is, when the surface viewed by the user in the organic light emitting diode panel is defined as an upper portion of the organic light emitting diode panel, the optical path control member may be disposed on the organic light emitting diode panel. The display panel 2000 may include a self-luminous element that does not require a separate light source. In the display panel 2000, a thin film transistor may be formed on the first' substrate 2100, and an organic light emitting element in contact with the thin film transistor may be formed. The organic light emitting element may include an anode, a cathode, and an organic light emitting layer formed between the anode and the cathode. In addition, the second' substrate 2200 configured to function as an encapsulation substrate for encapsulation may be further included on the organic light emitting element.

That is, light emitted from the display panel 2000 or the backlight unit 3000 may move from the second substrate 120 toward the first substrate 110 of the optical path control member.

In addition, although not shown in drawings, a polarizing plate may be further disposed between the optical path control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting diode panel, the polarizing plate may be the external light reflection inhibiting polarizing plate.

In addition, an additional functional layer 1300 such as an anti-reflection layer, an anti-glare, or the like may be further disposed on the optical path control member 1000. Specifically, the functional layer 1300 may be adhered to one surface of the first substrate 110 of the optical path control member. Although not shown in drawings, the functional layer 1300 may be adhered to the first substrate 110 of the optical path control member via an adhesive layer. In addition, a release film for protecting the functional layer may be further disposed on the functional layer 1300.

Further, a touch panel may be further disposed between the display panel and the optical path control member.

It is shown in the drawings that the optical path control member is disposed at an upper portion of the display panel, but the embodiment is not limited thereto, and the optical path control member may be disposed at various positions such as a position in which light is adjustable, that is, a lower portion of the display panel, or between a second substrate and a first substrate of the display panel, or the like.

In addition, it is shown in the drawings that the light conversion unit of the optical path control member according to the embodiment is in a direction parallel or perpendicular to an outer surface of the second substrate, but the light conversion unit is formed to be inclined at a predetermined angle from the outer surface of the second substrate. Through this, a moire phenomenon occurring between the display panel and the optical path control member may be reduced.

Figure 37:
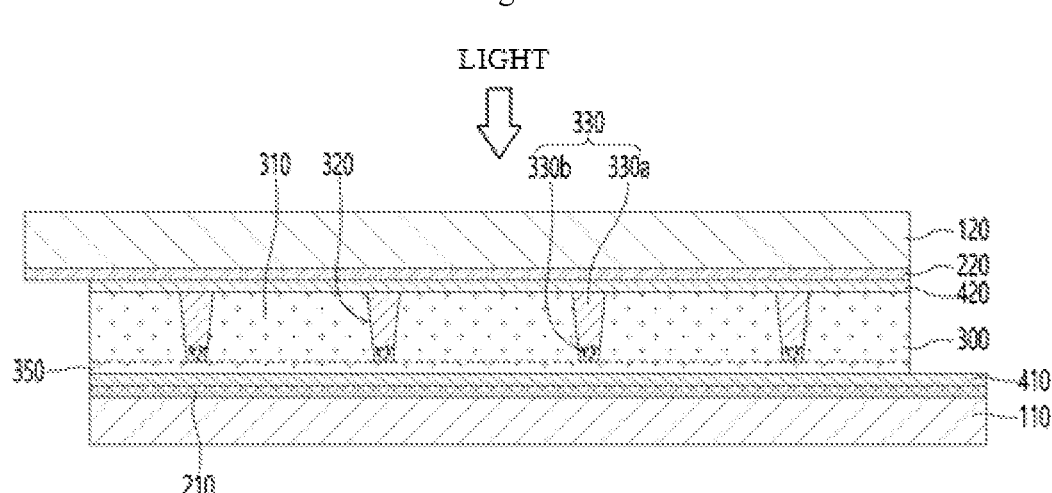
FIGS. 37 to 39 are views for describing one embodiment of the display device to which the optical path control member according to the embodiment is applied.
Figure 37:
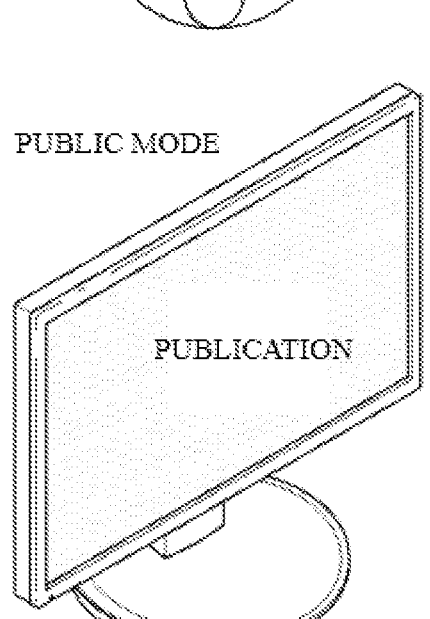
Figure 38:
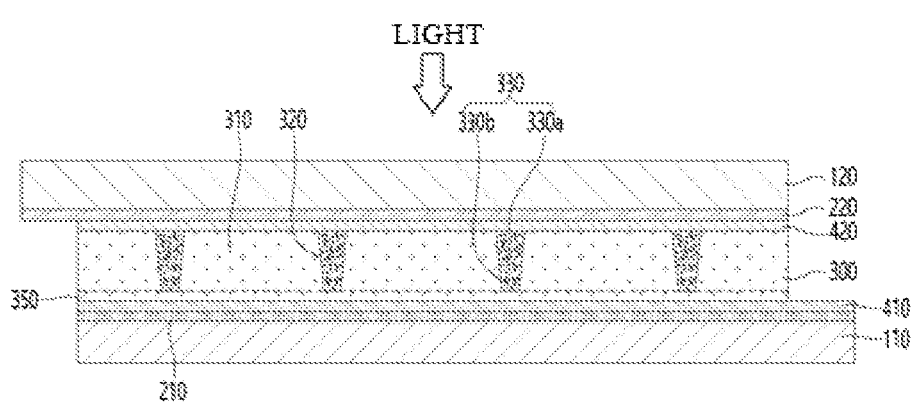
Figure 38:
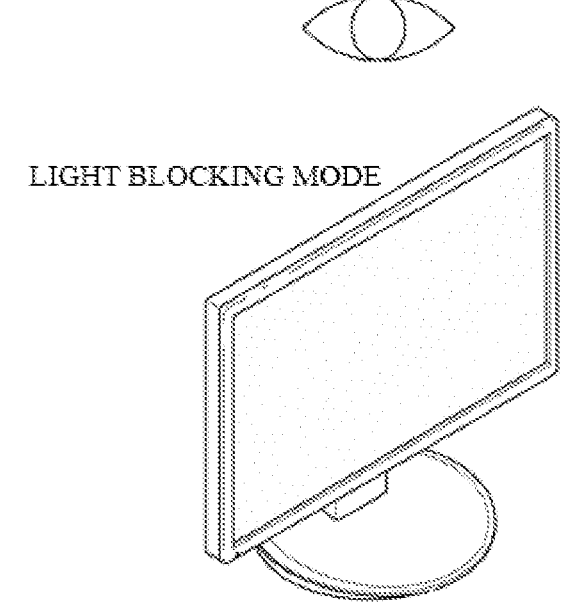
Figure 39:
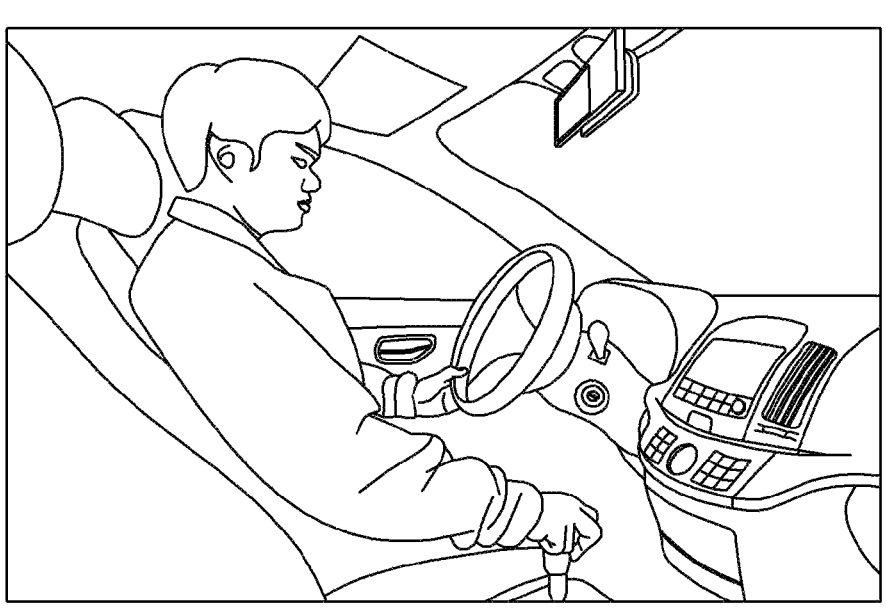

Referring to FIGS. 37 to 39, an optical path control member according to an embodiment may be applied to various display devices.

Referring to FIGS. 37 to 39, the optical path control member according to the embodiment may be applied to a display device that displays a display.

For example, when power is applied to the optical path control member as shown in FIG. 37, the accommodation part functions as the light transmitting part, so that the display device may be driven in the public mode, and when power is not applied to the optical path control member as shown in FIG. 38, the accommodation part functions as the light blocking part, so that the display device may be driven in the light blocking mode.

Accordingly, a user may easily drive the display device in a privacy mode or a normal mode according to application of power.

Light emitted from the backlight unit or the self-luminous element may move from the first substrate toward the second substrate. Alternatively, the light emitted from the backlight unit or the self-luminous element may also move from the second substrate toward the first substrate.

In addition, referring to FIG. 39, the display device to which the optical path control member according to the embodiment is applied may also be applied inside a vehicle.

For example, the display device including the optical path control member according to the embodiment may display a video confirming information of the vehicle and a movement route of the vehicle. The display device may be disposed between a driver seat and a passenger seat of the vehicle.

In addition, the optical path control member according to the embodiment may be applied to a dashboard that displays a speed, an engine, an alarm signal, and the like of the vehicle.

Further, the optical path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical path control member comprising:
   a first substrate;
   a first electrode disposed on the first substrate;
   a second substrate disposed on the first substrate;
   a second electrode disposed under the second substrate; and
   a light conversion unit disposed between the first electrode and the second electrode,
   wherein the light conversion unit includes a plurality of partition parts and a plurality of accommodation parts alternately disposed,
   each of the plurality of accommodation parts includes a dispersion liquid and light conversion particles dispersed in the dispersion liquid,
   the plurality of accommodation parts are driven in a public mode and a privacy mode depending on whether a voltage is applied, the plurality of accommodation parts are converted from the privacy mode to the public mode, when a first voltage is applied, the plurality of accommodation parts are converted from the public mode to the privacy mode, when a second voltage and a third voltage are applied, and wherein the second voltage has a pulse voltage in which a negative voltage and a positive voltage are continuously repeated, and the third voltage has a pulse voltage in which a negative voltage and a positive voltage are continuously repeated after the second voltage is applied, wherein an application time of the negative voltage in the pulse voltage of each of the second voltage and the third voltage is greater than an application time of the positive voltage in the pulse voltage of each of the second voltage and the third voltage, respectively, wherein absolute values of the first voltage, the positive voltage of the second voltage, the negative voltage of the second voltage, the positive voltage of the third voltage, and the negative voltage of the third voltage are equal, and wherein a ratio of the application time of the negative voltage and the application time of the positive voltage of the second voltage is greater than 8:1 and less than 9:1.

2. A display device comprising:

a display panel including a light source; and the optical path control member of claim 1 disposed on the display panel.

3. The display device of claim 2, wherein the display panel includes a backlight unit and a liquid crystal display panel, the optical path control member is disposed between the backlight unit and the liquid crystal display panel, and light emitted from the backlight unit moves from the second substrate toward the first substrate.

4. The optical path control member of claim 1, wherein the positive voltage of the third voltage and the negative voltage of the third voltage are repeated at 10 to 15 cycles.

5. The optical path control member of claim 1, wherein total application time, which is a sum of an application time of the second voltage and an application time of the third voltage, is 3 seconds or less.

6. The optical path control member of claim 1, wherein a number of cycles of the third voltage is greater than a number of cycles of the second voltage.

* * * * *